US011343711B2

(12) United States Patent
Takakura et al.

(10) Patent No.: US 11,343,711 B2
(45) Date of Patent: May 24, 2022

(54) UE AND COMMUNICATION CONTROL METHOD FOR UE

(71) Applicants: SHARP KABUSHIKI KAISHA, Sakai (JP); FG Innovation Company Limited, Tuen Mun (HK)

(72) Inventors: Tsuyoshi Takakura, Sakai (JP); Masafumi Aramoto, Sakai (JP); Shuichiro Chiba, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 78 days.

(21) Appl. No.: 16/765,413

(22) PCT Filed: Nov. 20, 2018

(86) PCT No.: PCT/JP2018/042912
§ 371 (c)(1),
(2) Date: May 19, 2020

(87) PCT Pub. No.: WO2019/098392
PCT Pub. Date: May 23, 2019

(65) Prior Publication Data
US 2020/0336935 A1    Oct. 22, 2020

(30) Foreign Application Priority Data

Nov. 20, 2017 (JP) .............................. JP2017-222794
Nov. 29, 2017 (JP) .............................. JP2017-228771

(51) Int. Cl.
*H04W 28/02* (2009.01)
*H04W 76/18* (2018.01)
(Continued)

(52) U.S. Cl.
CPC ....... *H04W 28/0289* (2013.01); *H04W 48/06* (2013.01); *H04W 48/18* (2013.01); *H04W 76/18* (2018.02)

(58) Field of Classification Search
None
See application file for complete search history.

(56) References Cited

U.S. PATENT DOCUMENTS

2019/0223093 A1* 7/2019 Watfa ................... H04W 48/18
2019/0230584 A1* 7/2019 Lou ...................... H04W 76/27
(Continued)

FOREIGN PATENT DOCUMENTS

WO    2018/131413 A1    7/2018

OTHER PUBLICATIONS

3GPP TS 23.501 V1.5.0 (Nov. 2017) 3rd Generation Partnership Project; Technical Specification Group Services and System Aspects; System Architecture for the 5G System; Stage 2 (Release 15).
(Continued)

*Primary Examiner* — Robert M Morlan
(74) *Attorney, Agent, or Firm* — ScienBiziP, P.C.

(57) ABSTRACT

A notification is made of information in one PDU session establishment procedure to a terminal apparatus, the information being associated with information for identifying one NW slice that is a target of congestion control and the information for identifying another NW slice associated, to prevent a PDU session establishment procedure using information for identifying multiple NW slices at a time. As a method for interpreting the information for identifying the other NW slice associated, two implementation schemes are defined that use explicit notifications from a network and rules configured for the terminal apparatus. In a case that NW slice based congestion control is applied, information for identifying the NW slice to which establishment of a PDU session is allowed is notified as an exception. In a case that the terminal apparatus notified of a DCN ID during the 5GS connection moves to the EPS after application of 5GS congestion control, connection to the DCN ID that provides the same service level as the NW slice of the target of congestion control is also prevented. This provides a communication control method for implementing a management processing such as 5G congestion control initiated by a terminal apparatus or a network.

4 Claims, 11 Drawing Sheets

(51) Int. Cl.
*H04W 48/06* (2009.01)
*H04W 48/18* (2009.01)

(56) References Cited

U.S. PATENT DOCUMENTS

2019/0246334 A1* 8/2019 Wang .................... H04W 48/08
2020/0367149 A1* 11/2020 Kang .................... H04W 48/18

OTHER PUBLICATIONS

3GPP TS 23.502 V1.3.0 (Nov. 2017) 3rd Generation Partnership Project; Technical Specification Group Services and System Aspects; Procedures for the 5G System; Stage 2 (Release 15).
"Reply LS on session management congestion control", 3GPP TSG-SA WG2 Meeting #125, S2-181263, Gothenburg, Sweden, Jan. 22-26, 2018.
"LS on session management congestion control", 3GPP TSG CT WG 1 Meeting 107, TDoc C1-175379, Reno (USA), Nov. 27-Dec. 1, 2017.
"Pseudo-CR on Intro of NAS level based congestion control", 3GPP TSG-CT WG1 Meeting #107, C1-174901, Reno (USA), Nov. 27-Dec. 1, 2017.
Ericsson et al., "Support for Congestion/ control", S2-177845 SA WG2 Meeting #123, Oct. 23-27, 2017, Ljubljana, Slovenia.

* cited by examiner

UE AND COMMUNICATION CONTROL METHOD FOR UE

TECHNICAL FIELD

The present invention relates to a UE and a communication control method for a UE. This application claims priority based on JP 2017-222794 filed on Nov. 20, 2017 in Japan, and JP 2017-228771 filed on Nov. 29, 2017 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE), which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

The 3GPP recently has been studying a next-generation communication technology and a system architecture for 5th Generation (5G) mobile communication system, which is a next-generation mobile communication system. With the specific aim of realizing a system for achieving the 5G mobile communication system, the 3GPP is in a process of standardizing 5G System (5GS) (see NPL 1 and NPL 2). In the 5GS, technical problems attributable to connection of various terminals to a cellular network are extracted to standardize solutions.

For example, the requirements include optimization and diversification of a communication procedure for supporting a continual mobile communication service depending on a terminal supporting various access networks, optimization of a system architecture in line with the optimization and diversification of the communication procedure, and the like.

CITATION LIST

Non Patent Literature

NPL 1: 3GPP TS 23.501 v1.5.0; 3rd Generation Partnership Project; Technical Specification Group Services and System Aspects; System Architecture for the 5G system; Stage 2 (Release 15)

NPL 2: 3GPP TS 23.502 v1.3.0; 3rd Generation Partnership Project; Technical Specification Group Services and System Aspects; Procedures for the 5G system; Stage 2 (Release 15)

SUMMARY OF INVENTION

Technical Problem

In the 5GS, in addition to a mechanism to provide a function corresponding to congestion control in the EPS, congestion control in Network Slices has been studied (see NPL 1 and NPL 2).

However, in terms of network slices, although it is defined that a terminal apparatus can connect to multiple network slices, the management processing performed in a case that the terminal apparatus connects to multiple network slices or Data Networks is not clearly defined.

In light of the foregoing, an object of the present invention is to provide a mechanism and a communication control method for implementing management processing such as congestion control for each network slice.

Solution to Problem

A User Equipment (UE) according to the present invention is a UE including a controller, wherein a first timer is started for Data Network Name (DNN) based congestion control per DNN basis, a second timer is running for Single Network Slice Selection Assistance information (S-NSSAI) based congestion control per S-NSSAI and DNN basis, the first timer and the second timer are associated with the same DNN provided by the UE, and the controller runs the first timer and the second timer simultaneously.

A communication control method for a User Equipment (UE) according to the present invention includes: starting a first timer for Data Network Name (DNN) based congestion control per DNN basis, running a second timer for Single Network Slice Selection Assistance information (S-NSSAI) based congestion control per S-NSSAI and DNN basis, wherein the first timer and the second timer are associated with the same DNN provided by the UE, and the UE runs the first timer and the second timer simultaneously.

Advantageous Effects of Invention

According to the present invention, a terminal apparatus constituting the 5GS or an apparatus in a core network can perform management processing, such as congestion control, for each network slice and/or DNN or APN initiated by the terminal apparatus or initiated by the network.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. System Overview

Figure 1:
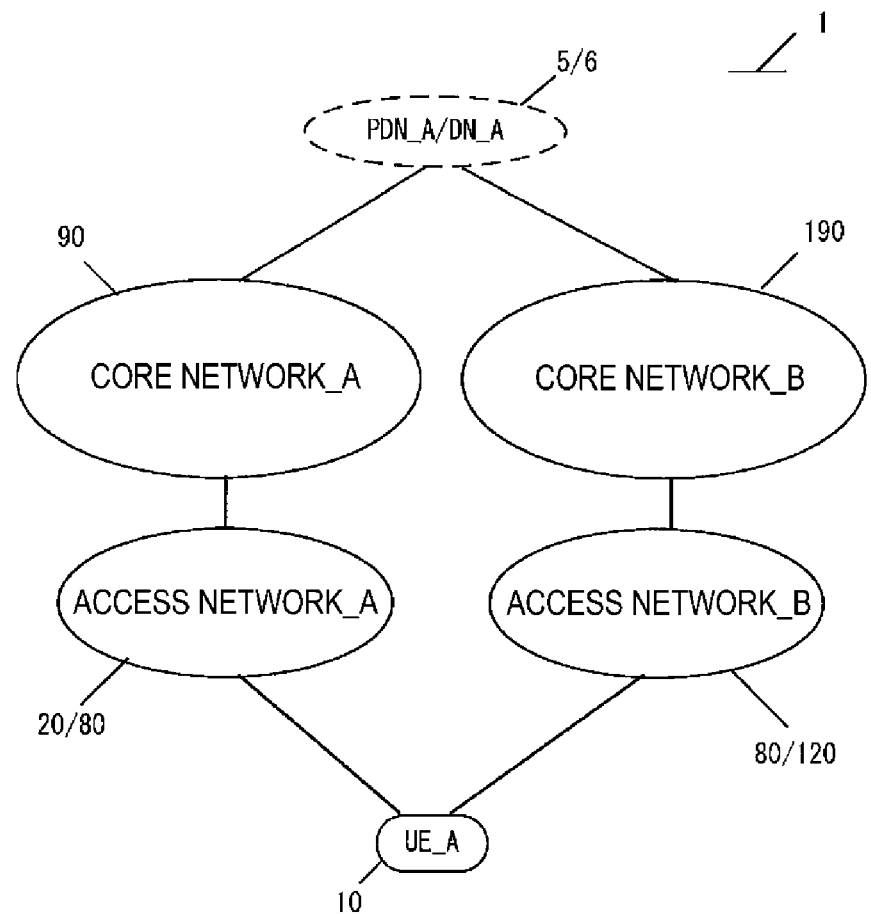
FIG. 1 is a diagram illustrating an overview of a mobile communication system.
Figure 2:
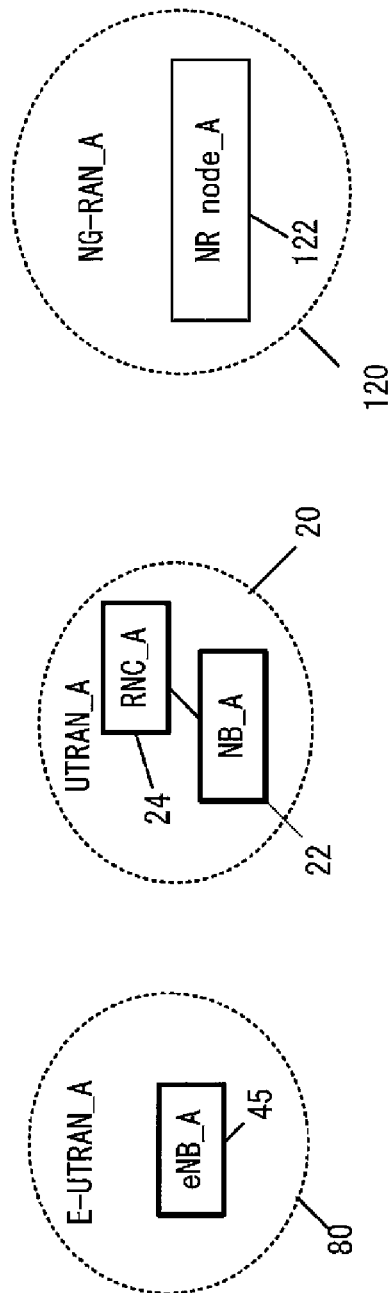
FIG. 2 is a diagram illustrating an example of a configuration or the like of access networks in the mobile communication system.
Figure 3:
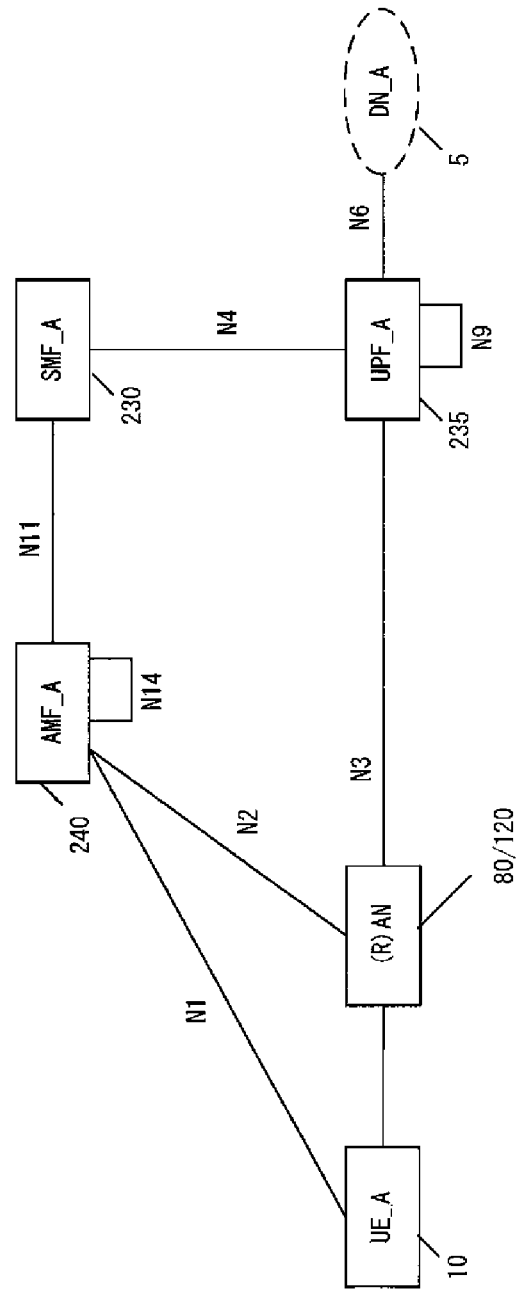
FIG. 3 is a diagram illustrating an example of a configuration or the like of a core network_B in the mobile communication system.
Figure 11:
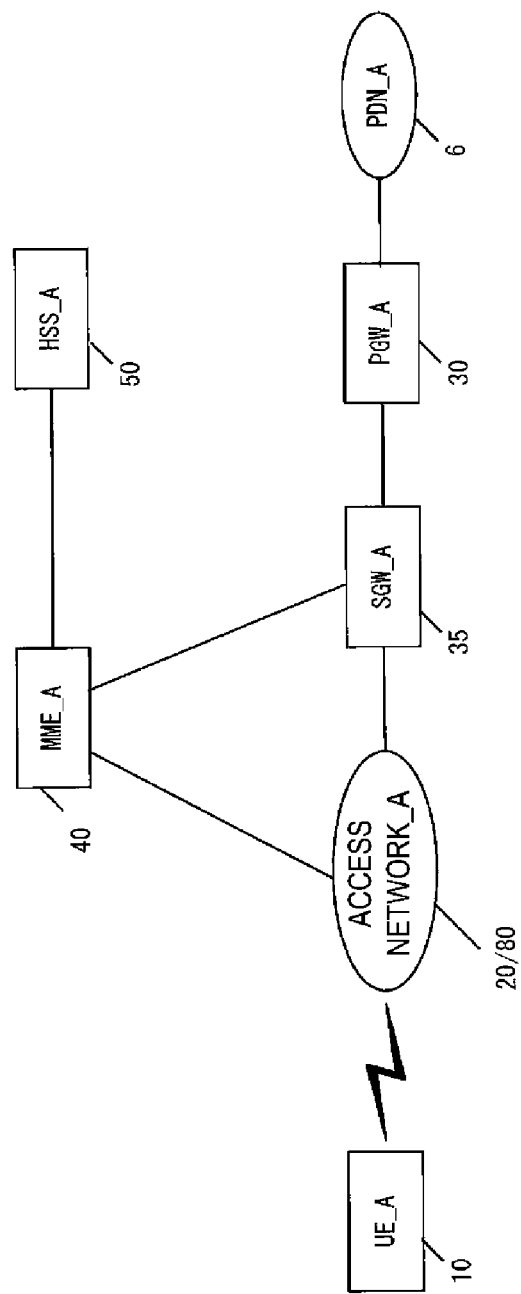
FIG. 11 is a diagram illustrating an example of a configuration or the like of a core network_A in the mobile communication system.

An overview of a mobile communication system according to the present embodiment will be described with reference to FIGS. 1, 2, 3, and 11. FIG. 2 is a diagram illustrating details of access networks of the mobile communication system of FIG. 1. FIG. 3 is a diagram mainly illustrating details of a core network_B 190 in the mobile communication system of FIG. 1. FIG. 11 is a diagram mainly illustrating details of a core network_A 90 in the mobile communication system of FIG. 1. As illustrated in FIG. 1, a mobile communication system 1 according to the present embodiment includes a terminal apparatus (which is also referred to as a user equipment, or a mobile terminal apparatus) UE (User Equipment)_A 10, an Access Network (AN)_A, an access network_B, a Core Network (CN)_A 90, a core network_B 190, a Packet Data Network (PDN)_A 6, and a Data Network (DN)_A 5. Note that a combination of the access network_A and the core network_A may be referred to as an Evolved Packet System (EPS, the 4G mobile communication system), a combination of the access network_B, core network_B and the UE_A 10 may be referred to as a 5G System (5GS, 5G mobile communication system), and configurations of the 5GS and the EPS may not be limited thereto. Note that, for the sake of simplicity, the core network_A, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). The UE_A 10 may also include a Universal Integrated Circuit Card (UICC) and an Embedded UICC (eUICC). The UE_A 10 may be a wirelessly connectable terminal apparatus and may be Mobile Equipment (ME), a Mobile Station (MS), a Cellular Internet of Things (CIoT) terminal (CIoT UE), or the like.

The UE_A 10 can be connected to an access network and/or a core network. The UE_A 10 can be connected to the DN_A and/or the PDN_A via the access network and/or the core network. The UE_A 10 transmits and/or receives (communicates) the user data to and/or from the DN_A and/or the PDN_A by using a Protocol Data Unit or a Packet Data Unit (PDU) session and/or a Packet Data Network (PDN) connection (also referred to as a PDN connection). Furthermore, the communication of the user data is not limited to Internet Protocol (IP) communication (IPv4 or IPv6), but may be, for example, non-IP communication in the EPS, or may be Ethernet (trade name) communication or Unstructured communication in the 5GS.

Here, the IP communication is data communication using the IP, and is data communication achieved by transmitting and/or receiving an IP packet including an IP header. Note that a payload section constituting the IP packet may include the user data transmitted and/or received by the UE_A 10. The non-IP communication is data communication without using the IP, and is data communication achieved by transmitting and/or receiving data without an IP header. For example, the non-IP communication may be the data communication achieved by transmitting and/or receiving application data not given an IP address, or may transmit and/or receive the user data transmitted and/or received by the UE_A 10 to which another header such as a MAC header and an Ethernet (trade name) frame header is given.

The PDU session is connectivity established between the UE_A 10 and the DN_A 5 to provide a PDU connection service. To be more specific, the PDU session may be connectivity established between the UE_A 10 and an external gateway. Here, the external gateway may be a UPF, a Packet Data Network Gateway (PGW), and the like. The PDU session may also be a communication path established to transmit and/or receive the user data between the UE_A 10 and the core network and/or the DN, or a communication path established to transmit and/or receive the PDU. Furthermore, the PDU session may be a session established between the UE_A 10 and the core network and/or the DN, or may be a logical communication path including a transfer path such as one or more bearers and the like between apparatuses in the mobile communication system 1. To be more specific, the PDU session may be a connection established by the UE_A 10 with the core network_B 190 and/or an external gateway, or may be a connection established between the UE_A 10 and the UPF. The PDU session may also be connectivity and/or a connection between the UE_A 10 and the UPF_A 235 via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 by using the PDU session. In other words, the PDU session can transfer the user data transmitted and/or received between the UE_A 10 and an apparatus, such as an application server, that is located in the DN_A 5. Furthermore, each apparatus (the UE_A 10, an apparatus in the access network, and/or an apparatus in the core network, and/or an apparatus in the data network) may correlate one or more pieces of identification information to the PDU session for management. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice Instance ID.

The access network_A and the access network_B may be any of a Universal Terrestrial Radio Access Network (UTRAN)_A 20, an Evolved Universal Terrestrial Radio Access Network (E-UTRAN)_A 80, and an NG-RAN (5G-RAN)_A 120 as illustrated in FIG. 2. Note that hereinafter, the UTRAN_A 20 and/or the E-UTRAN_A 80 and/or the NG-RAN_A 120 may be referred to as a 3GPP access or a 3GPP access network, and a wireless LAN access network or a non-3GPP AN may be referred to as a non-3GPP access or a non-3GPP access network. Each radio access network includes an apparatus to which the UE_A 10 is actually connected (e.g., a base station apparatus or an access point), and the like.

For example, the E-UTRAN_A 80 is an access network for LTE and includes one or more eNBs_A 45. The eNB_A 45 is a radio base station to which the UE_A 10 connects through the Evolved Universal Terrestrial Radio Access (E-UTRA). In a case that multiple eNBs are present in the E-UTRAN_A 80, the multiple eNBs may be connected to each other.

The NG-RAN_A 120 is a 5G access network, and includes one or more New Radio Access Technology nodes (NR nodes)_A 122. The NR node_A 122 is a radio base station to which the UE_A 10 connects with the 5G Radio Access. In a case that there are multiple NR nodes_A 122 in the NG-RAN_A 120, each of the multiple NR nodes_A 122 may be connected to one another. Note that the NR node_A 122 is also referred to as a gNB.

Note that the NG-RAN_A 120 may be an access network configured in the E-UTRA and/or the 5G Radio Access. In other words, the NG-RAN_A 120 may include the eNB_A 45, or may include the NR node_A 122, or may include both the eNB_A 45 and the NR node_A 122. In this case, the eNB_A 45 and the NR node_A 122 may be similar apparatuses. Therefore, the NR node_A 122 can be substituted with the eNB_A 45.

The UTRAN_A 20 is an access network of the 3G mobile communication system, and includes a Radio Network Controller (RNC)_A 24 and a Node B (NB)_A 22. The NB_A 22 is a radio base station to which the UE_A 10 connects through the Universal Terrestrial Radio Access (UTRA), and the UTRAN_A 20 may include one or multiple radio base stations. The RNC_A 24 is a controller for connecting the core network_A 90 and the NB_A 22, and the UTRAN_A 20 may include one or multiple RNCs. The RNC_A 24 may be connected to one or multiple NBs_A 22. Furthermore, the RNC_A 24 may be connected to a radio base station (a Base Station Subsystem (BSS)_A 26) included in a GERAN_A 25.

The GERAN_A 25 is a 2G access network, and includes the BSS_A 26. The BSS_A 26 is a radio base station to which the UE_A 10 connects through GSM (trade name)/EDGE Radio Access (GERA), and the GERAN_A 25 may include one or multiple BSSs_A 26. The multiple BSSs_A 26 may be connected to each other. The BSS_A 26 may be connected to the RNC_A 24.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45."

Furthermore, the access network is a radio network connecting with the UE_A 10 and/or the core network. The access network may be a 3GPP access network, or a non-3GPP access network. Note that the 3GPP access network may be the UTRAN_A 20, the E-UTRAN_A 80, and the NG-Radio Access Network (RAN)_A 120, and the non-3GPP access network may be a radio access point (WLAN AN). Note that the UE_A 10 may connect to the access network or to the core network via the access network in order to connect to the core network.

The DN_A 5 and the PDN_A 6 are Data Networks that provide communication services to the UE_A 10, may be configured as packet data service networks, and may be configured for each service. Furthermore, the DN_A 5 may include a connected communication terminal. Therefore, connecting with the DN_A 5 may be connecting with a communication terminal or a server located in the DN_A 5. Furthermore, the transmission and/or reception of the user data to and/or from the DN_A 5 may be transmission and/or reception of the user data to and/or from a communication terminal or a server located in the DN_A 5. Although the DN_A 5 is outside the core networks in FIG. 1, it may be within the core networks.

The core network_A 90 and/or the core network_B 190 may be configured as one or more apparatuses in a core network. Here, the apparatuses in a core network may be apparatuses that perform part or all of processing or functions of apparatuses included in the core network_A 90 and/or the core network_B 190. Note that the apparatus in the core network may be referred to as a core network apparatus.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be the Evolved Packet Core (EPC) constituting the Evolved Packet System (EPS), and the core network_B 190 may be the 5G Core Network (5GC) constituting the 5GS. Furthermore, the core network_B 190 may be a core network for a system providing the 5G communication service. Conversely, the EPC may be the core network_A 90, and the 5GC may be the core network_B 190. Note that the core network_A 90 and/or the core network_B 190 is not limited to the above, and may be a network for providing a mobile communication service.

Next, the core network_A 90 will be described. The core network_A 90 may include at least one of a Home Subscriber Server (HSS)_A 50, an Authentication Authorization Accounting (AAA), a Policy and Charging Rules Function (PCRF), a PGW_A 30, an ePDG, an SGW_A 35, an Mobility Management Entity (MME)_A 40, a Serving GPRS Support Node (SGSN), and an SCEF. Furthermore, these may also be configured as Network Functions (NFs). The NF may be a processing function included in a network. The core network_A 90 is capable of connecting to multiple radio access networks (the UTRAN_A 20, the E-UTRAN_A 80).

Although only the HSS (HSS_A 50), the PGW (PGW_A 30), the SGW (SGW_A 35), and the MME (MME_A 40) among the network elements are described in FIG. 11 for simplicity, it does not mean that no other apparatuses and/or NFs are included therein. Note that the UE_A 10 will also be referred to as a UE, the HSS_A 50 as an HSS, the PGW_A 30 as a PGW, the SGW_A 35 as a SGW, the MME_A 40 as an MME, and the DN_A 5 and/or the PDN_A 6 as a DN or a PDN for simplicity.

The following briefly describes each apparatus included in the core network_A 90.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Furthermore, the PGW_A 30 may be connected to an SGW and a DN and a User plane function (UPF) and/or a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management apparatus to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Furthermore, the MME_A 40 may be connected to an Access and Mobility Management Function (AMF).

In a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, may be a CP function (hereinafter, also referred to as a Control Plane Function (CPF) or a Control Plane Network Function) for the control information and/or control message, or may be a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as Mobility Management (MM) and Session Management (SM), or capability information. The NF may be a function apparatus to realize a single function, or a function apparatus to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management apparatus different from the MME_A 40. For example, the HSS_A 50 may be connected to the CPF_A 140.

Furthermore, for the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

The PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN_A 25, and the SGW_A 35, for performing location management between the 3G/2G access network (UTRAN/GERAN) and the LTE (4G) access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90.

Furthermore, multiple gateways connecting the core network_A 90 with a single DN_A 5 and/or PDN_A 6 and/or DN may be also deployed. Note that the SCEF may be outside or inside the core network.

Next, the core network_B 190 will be described. The core network_B 190 may include at least one of an Authentication Server Function (AUSF), an Access and Mobility Management Function (AMF)_A 240, an Unstructured Data Storage Function (UDSF), a Network Exposure Function (NEF), a Network Repository Function (NRF), a Policy Control Function (PCF), a Session Management Function (SMF)_A 230, a Unified Data Management (UDM), a User Plane Function (UPF)_A 235, an Application Function (AF), and a Non-3GPP Interworking Function (N3IWF). Furthermore, these may also be configured as Network Functions (NFs). The NF may be a processing function included in a network.

Although only the AMF (AMF_A 240), the SMF (SMF_A 230), and the UPF (UPF_A 235) are illustrated in FIG. 3 among the above elements for simplicity, it does not mean that no other elements (an apparatus and/or a Network Function (NP)) are included therein. Note that the UE_A 10 is also referred to as a UE, the AMF_A 240 as an AMF, the SMF_A 230 as an SMF, the UPF_A 235 as a UPF, and the DN_A 5 as a DN for simplicity.

FIG. 3 shows an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between (R) access network (AN) and the AMF, the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses.

Note that FIG. 3 is a system configuration diagram in a case that the UE simultaneously accesses two DNs by using multiple PDU sessions. Two SMFs are selected for two different PDU sessions. There are two SMFs_A 230 and two UPFs_A 235 in FIG. 3.

The following briefly describes each apparatus included in the core network_B 190.

First, the AMF_A 240 is connected to another AMF, SMF (SMF_A 230), the access network (i.e., the UTRAN_A 20, the E-UTRAN_A 80, and the NG-RAN_A 120), the UDM, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. One or more AMFs_A 240 may be deployed within the core network_B 190. The AMF_A 240 may be an NF that manages one or more Network Slice Instances (NSI). The AMF_A 240 may also be a Common Control Plane Network Function (Common CPNF, or CCNF) shared among multiple NSIs.

The RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

The CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. In the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. In the CM-CONNECTED state, the UE may have the N2 interface connection (N2 connection) and/or the N3 interface connection (N3 connection).

The SMF_A 230 may include a Session Management (SM) function of a PDU session or the like, an IP address allocation function for the UE and a management function thereof, a UPF selection and control function, a UPF configuration function for routing traffic to an appropriate destination, a function of reporting arrival of downlink data (Downlink Data Notification), a function to provide SM information unique to the AN (for each AN) to be transmitted to the AN via the AMF and the N2 interface, a function to determine a Session and Service Continuity mode (SSC mode) for a session, a roaming function, and the like. The SMF_A 230 may be connected to the AMF_A 240, the UPF_A 235, the UDM, and the PCF.

The UPF_A 235 is connected to the DN_A 5, the SMF_A 230, another UPF, and the access network (i.e., the UTRAN_A 20, the E-UTRAN_A 80, and the NG-RAN_A 120). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. The UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Note that a UPF_C 239 (also referred to as a branching point or an uplink classifier), which is a UPF different from the UPF_A 235, may be present between the UPF_A 235 and the access network as an apparatus or an NF. In the case that the UPF_C 239 is present, the PDU session between the UE_A 10 and the DN_A 5 is established via the access network, the UPF_C 239, and the UPF_A 235.

The AUSF is connected to the UDM and the AMF_A 240. The AUSF functions as an authentication server.

The UDSF provides a function for all NFs to store or retrieve information as unstructured data.

The NEF provides a way to securely provide services and capabilities provided by the 3GPP network. The NEF stores information received from another NF as structured data.

In a case that a NF Discovery Request is received from a NF instance, the NRF provides the NF with information of found NF instances or holds information of available NF instances or services supported by the instances.

The PCF is connected to the SMF (SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 4:
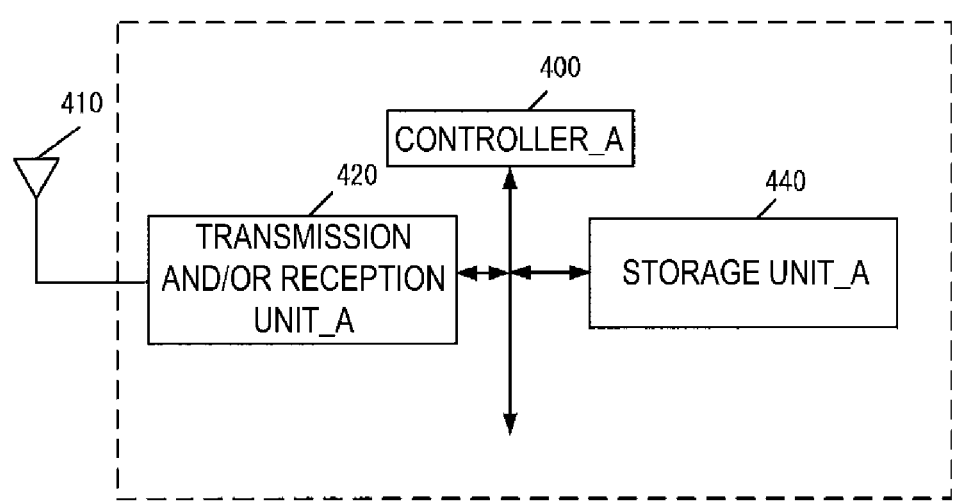
FIG. 4 is a diagram illustrating an apparatus configuration of a UE.

First, FIG. 4 illustrates an apparatus configuration example of the UE_A 10. As illustrated in FIG. 4, the UE_A 10 includes a controller_A 400, a transmission and/or reception unit_A 420, and a storage unit_A 440. The transmission and/or reception unit_A 420 and the storage unit_A 440 are connected to the controller_A 400 via a bus. An external antenna_A 410 is connected to the transmission and/or reception unit_A 420.

The controller_A 400 is a function unit for controlling the entire UE_A 10. The controller_A 400 reads out and performs various kinds of information and programs stored in the storage unit_A 440 to achieve various processes of the entire UE_A 10.

The transmission and/or reception unit_A 420 is a function unit through which the UE_A 10 connects to the base station (the UTRAN_A 20, the E-UTRAN_A 80, and the NG-RAN_A 120) and/or the wireless LAN access point (WLAN AN) in the access network and connects to the access network. In other words, the UE_A 10 can connect to the base station and/or the access point in the access network via the external antenna 410 connected to the transmission and/or reception unit_A 420. Specifically, the UE_A 10 can transmit and/or receive the user data and/or the control information with the base station and/or the access point in the access network via the external antenna 410 connected to the transmission and/or reception unit_A 420.

The storage unit_A 440 is a function unit that stores programs, data, and the like necessary for each operation by the UE_A 10, and includes, for example, a semiconductor memory, a Hard Disk Drive (HDD), a Solid State Drive (SSD), and the like. The storage unit_A 440 stores identification information, control information, a flag, a parameter, a rule, a policy, and the like included in the control message transmitted and/or received in a communication procedure described later.

1.2.2. eNB/NR Node

Figure 5:
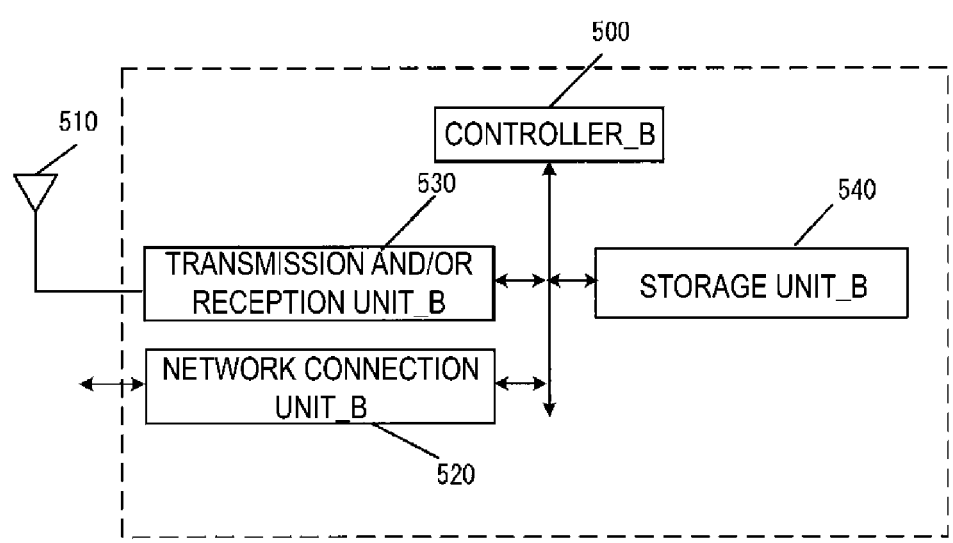
FIG. 5 is a diagram illustrating an apparatus configuration of an eNB/NR node.

Next, FIG. 5 illustrates an apparatus configuration example of the eNB_A 45 and the NR node_A 122. As illustrated in FIG. 5, the eNB_A 45 and the NR node_A 122 include a controller_B 500, a network connection unit_B 520, a transmission and/or reception unit_B 530, and a storage unit_B 540. The network connection unit_B 520, the transmission and/or reception unit_B 530, and the storage unit_B 540 are connected to the controller_B 500 via a bus. An external antenna 510 is connected to the transmission and/or reception unit_B 530.

The controller_B 500 is a function unit for controlling the entire eNB_A 45 and NR node_A 122. The controller_B 500 reads out and performs various kinds of information and programs stored in the storage unit_B 540 to achieve various processes of the entire eNB_A 45 and NR node_A 122.

The network connection unit_B 520 is a function unit for the eNB_A 45 and the NR node_A 122 to connect to the AMF_A 240 and the UPF_A 235 in the core network. In other words, the eNB_A 45 and the NR node_A 122 can be connected to the AMF_A 240 and the UPF_A 235 in the core network via the network connection unit_B 520. Specifically, the eNB_A 45 and the NR node_A 122 can transmit and/or receive the user data and/or the control information to and/or from the AMF_A 240 and/or the UPF_A 235 via the network connection unit_B 520.

The transmission and/or reception unit_B 530 is a function unit through which the eNB_A 45 and the NR node_A 122 connect to the UE_A 10. In other words, the eNB_A 45 and the NR node_A 122 can transmit and/or receive the user data and/or the control information to and/or from the UE_A 10 via the transmission and/or reception unit_B 530.

The storage unit_B 540 is a function unit for storing programs, data, and the like necessary for each operation by the eNB_A 45 and the NR node_A 122. The storage unit_B 540 includes, for example, a semiconductor memory, an HDD, an SSD, or the like. The storage unit_B 540 stores identification information, control information, a flag, a parameter, and the like included in the control message transmitted and/or received in a communication procedure described later. The storage unit_B 540 may store these pieces of information as the contexts for each UE_A 10.

1.2.3. Configuration of MME/AMF

Figure 6:
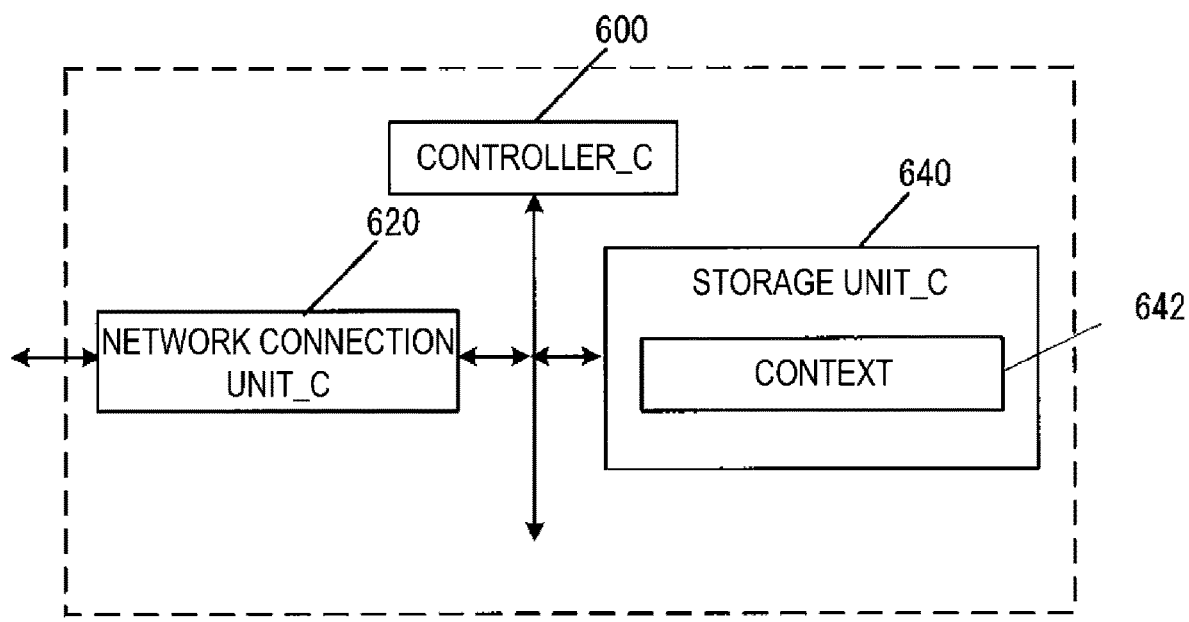
FIG. 6 is a diagram illustrating an apparatus configuration of an AMF/MME.

Next, FIG. 6 illustrates an example of an apparatus configuration of the MME_A 40 or the AMF_A 240. As illustrated in FIG. 6, the MME_A 40 or the AMF_A 240 includes a controller_C 600, a network connection unit_C 620, and a storage unit_C 640. The network connection unit_C 620 and the storage unit_C 640 are connected to the controller_C 600 via a bus. The storage unit_C 640 stores a context 642.

The controller_C 600 is a function unit for controlling the entire MME_A 40 or AMF_A 240. The controller_C 600 reads out and performs various kinds of information and programs stored in the storage unit_C 640 to achieve various processes of the entire AMF_A 240.

The network connection unit_C 620 is a function unit through which the MME_A 40 or the AMF_A 240 connects to another MME_A 40, AMF_A 240, SMF_A 230, a base station (the UTRAN_A 20, the E-UTRAN_A 80, and the NG-RAN_A 120) and/or a wireless LAN access point (FLAN AN), a UDM, an AUSF, and a PCF in the access network. In other words, the MME_A 40 or the AMF_A 240 can transmit and/or receive user data and/or control information to and/or from the base station and/or the access point, the UDM, the AUSF, and the PCF in the access network via the network connection unit_C 620.

The storage unit_C 640 is a function unit for storing programs, data, and the like necessary for each operation of the MME_A 40 or the AMF_A 240. The storage unit_C 640 includes, for example, a semiconductor memory, an HDD, an SSD, and the like. The storage unit_C 640 stores identification information, control information, a flag, a parameter, and the like included in the control message transmitted and/or received in a communication procedure described later. The context 642 stored in the storage unit_C 640 may be a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. The context stored for each PDU session may include an APN in Use, an Assigned Session Type, IP address(es), a PGW F-TEID, an SCEF ID, and a Default bearer. The context stored for each bearer may include an EPS Bearer ID, a TI, a TFT, an SGW F-TEID, a PGW F-TEID, an MME F-TEID, an eNB Address, an NR node Address, a WAG Address, an eNB ID, an NR node ID, and a WAG ID.

1.2.4. Configuration of SMF

Figure 7:
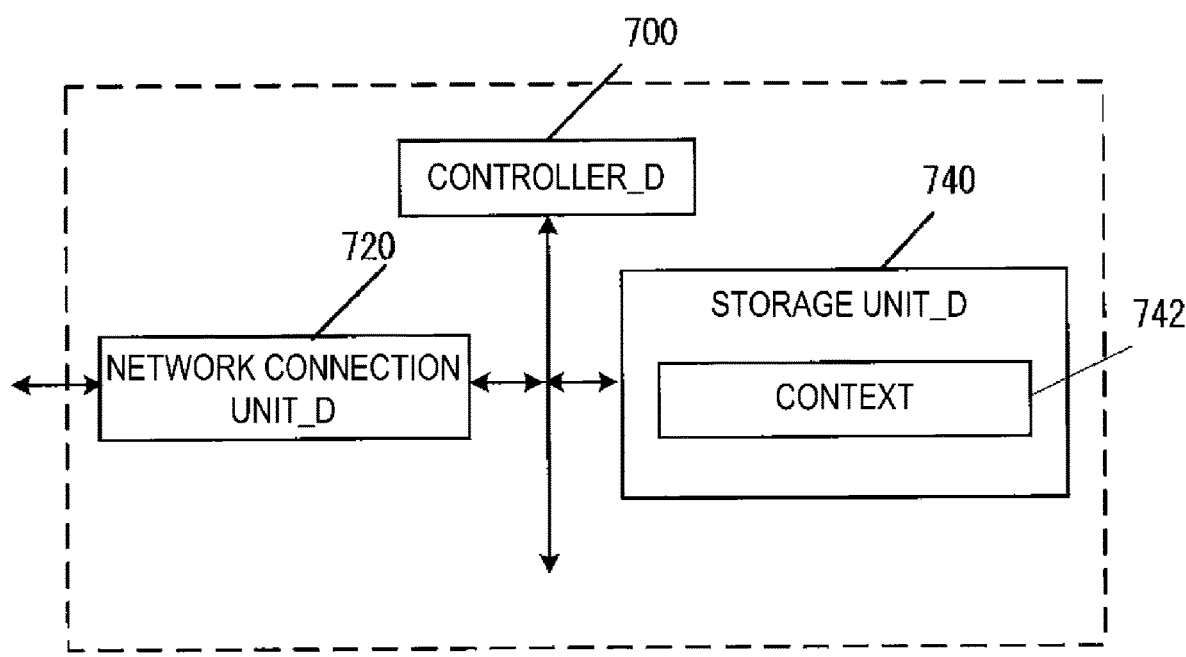
FIG. 7 is a diagram illustrating an apparatus configuration of an SMF/URF.

Next, FIG. 7 illustrates an example of an apparatus configuration of the SMF_A 230. As illustrated in FIG. 7, each of the SMFs_A 230 includes a controller_D 700, a network connection unit_D 720, and a storage unit_D 740. The network connection unit_D 720 and the storage unit_D 740 are connected to the controller_D 700 via a bus. The storage unit_D 740 stores the context 742.

The controller_D 700 in the SMF_A 230 is a function unit for controlling the entire SMF_A 230. The controller_D 700 reads out and performs various pieces of information and programs stored in the storage unit_D 740 to achieve various processes of the entire SMF_A 230.

The network connection unit_D 720 in the SMF_A 230 is a function unit for the SMF_A 230 to connect to the AMF_A 240, the UPF_A 235, the UDM, and the PCF. In other words, the SMF_A 230 can transmit and/or receive the user data and/or the control information to and/or from the AMF_A 240, the UPF_A 235, the UDM, and the PCF via the network connection unit_D 720.

The storage unit_D 740 in the SMF_A 230 is a function unit for storing programs, data, and the like necessary for each operation by the SMF_A 230. The storage unit_D 740 in the SMF_A 230 includes, for example, a semiconductor memory, an HDD, an SSD, or the like. The storage unit_D 740 in the SMF_A 230 stores identification information, control information, a flag, a parameter, and the like included in the control message transmitted and/or received in a communication procedure described later. The context 742 stored in the storage unit_D 740 in the SMF_A 230 may be a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include Assigned Session Type, IP Address(es), SGW F-TEID, PGW F-TEID and Default Bearer. The context stored for each bearer may include an EPS bearer ID, a TFT, an SGW F-TEID, and a PGW F-TEID.

1.2.5. Configuration of PGW/UPF

Next, FIG. 7 illustrates an example of an apparatus configuration of the PGW_A 30 or the UPF_A 235. As illustrated in FIG. 7, each of the PGW_A 30 the UPF_A 235 includes the controller_D 700, the network connection unit_D 720, and the storage unit_D 740. The network connection unit_D 720 and the storage unit_D 740 are connected to the controller_D 700 via a bus. The storage unit_D 740 stores the context 742.

The controller_D 700 of the PGW_A 30 or the UPF_A 235 is a function unit for controlling the entire PGW_A 30 or UPF_A 235, and implements various processes of all of the PGW_A 30 or the UPF_A 235 by reading out and performing various types of information and programs stored in the storage unit_D 740.

The network connection unit_D 720 in the PGW_A 30 or the UPF_A 235 is a function unit for the PGW_A 30 or the UPF_A 235 to connect to the DN (that is, the DN_A 5), the SMF_A 230, another UPF_A 235, and the access network (that is, the UTRAN_A 20, the E-UTRAN_A 80, and the NG-RAN_A 120). In other words, the UPF_A 235 can transmit and/or receive the user data and/or the control information to and/or from the DN (that is, the DN_A 5), the SMF_A 230, another UPF_A 235, and the access network (that is, the UTRAN_A 20, the E-UTRAN_A 80, and the NG-RAN_A 120) via the network connection unit_D 720.

The storage unit_D 740 in the UPF_A 235 is a function unit for storing programs, data, and the like necessary for each operation by the UPF_A 235. The storage unit_D 740 in the UPF_A 235 includes, for example, a semiconductor memory, an HDD, an SSD, or the like. The storage unit_D 740 in the UPF_A 235 stores identification information, control information, a flag, a parameter, and the like included in the control message transmitted and/or received in a communication procedure described later. The context 742 stored in the storage unit_D 740 in the UPF_A 235 may be a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.6. Information Stored in Storage Unit of Each Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. The IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. The IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, may be an IPv6 address, may be an IPv6 prefix, or may be an interface ID. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating mapping between the DN ID and the APN, perform a procedure to inquire the APN by using the DN ID, or perform a procedure to inquire the DN ID by using the APN.

SCEF ID is an IP address of an SCEF_A 46 used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. The Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG_A 126. The WAG ID is information for identifying the WAG_A 126.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

First, in the present embodiment, the network refers to at least some of the access network_A 20/80, the access network_B 80/120, the core network_A 90, the core network_B 190, the DN_A 5, and the PDN_A 6. One or more apparatuses included in at least some of the access network_A 20/80, the access network_B 80/120, the core network_A 90, the core network_B 190, the DN_A 5, and the PDN_A 6 may be referred to as a network or a network apparatus. Specifically, the expression "the network performs transmission and/or reception of a message and/or performs a procedure" signifies that "an apparatus (network apparatus) in the network performs transmission and/or reception of a message and/or performs a procedure".

In the present embodiment, a Session Management (SM) message (also referred to as a Non-Access-Stratum (NAS) SM message) may be a NAS message used in a procedure for the SM, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. The procedure for SM may include a PDU session establishment procedure, a PDU session modification procedure, and the like.

In the present embodiment, a Tracking Area (TA) is a range that can be represented by location information of the UE_A 10 managed by the core network, and may include one or more cells, for example. The TA may be a range in which a control message such as a paging message is broadcast, or a range in which the UE_A 10 can move without performing a handover procedure.

In the present embodiment, a TA list is a list including one or more TAs assigned to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

In the present embodiment, a Network Slice is a logical network that provides specific network capabilities and network performance. Hereafter, the network slice may be referred to as an NW slice.

The Network Slice Instance (NSI) in the present embodiment is an entity of each of one or multiple Network Slices configured in the core network_B 190. The NSI in the present embodiment may include a virtual Network Function (NF) generated by using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be an apparatus shared by another network slice or otherwise. The UE_A 10 and/or an apparatus in the network can be assigned to one or multiple network slices, based on the NSSAI and/or the S-NSSAI and/or the UE usage type and/or one or multiple network slice type IDs and/or registration information such as one or multiple NS IDs and/or the APN.

The S-NSSAI in the present embodiment is an abbreviation for Single Network Slice Selection Assistance information, and is information for identifying a network slice. The S-NSSAI may include a Slice/Service type (SST) and a Slice Differentiator (SD). The S-NSSAI may be configured with only the SST, or may be configured with both the SST and the SD. Here, the SST is information indicating an operation of the network slice expected in terms of functions and services. The SD may be information that complements the SST in a case of selecting one NSI from multiple NSIs indicated by the SST. The S-NSSAI may be unique information for each Public Land Mobile Network (PLMN), or may be standard information shared between PLMNs. The network may store one or multiple S-NSSAIs in the registration information of the UE_A 10 as the default S-NSSAI.

The Single Network Slice Selection Assistance Information (NSSAI) in the present embodiment is a group of S-NSSAIs. Each S-NSSAI included in the NSSAI is information that assists the access network or the core network to select an NSI. The UE_A 10 may store the NSSAI allowed from the network for each PLMN. The NSSAI may be information used to select the AMF_A 240.

In the present embodiment, a first NW slice is a NW slice to which the established PDU session belongs in a case that the UE_A 10 connects to a specific DN. The first NW slice may be a NW slice managed in the operator A network or may be a NW slice that is commonly managed in the operator B network.

In the present embodiment, a second NW slice is a NW slice to which another PDU session capable of connecting to a DN, which is the connection destination of the PDU session belonging to the first NW slice, belongs. The first NW slice and the second NW slice may be operated by the same operator or may be operated by operators different from each other.

The operator A network according to the present embodiment is a network operated by the operator A. The operator A network may deploy the NW slices common to the operator B.

The operator B network according to the present embodiment is a network operated by the operator B. The operator B network may deploy the NW slices common to the operator A.

In the present embodiment, an equivalent PLMN is a PLMN treated to be the same PLMN as the same HPLMN in the network.

The Dedicated Core Network (DCN) in the present embodiment is one or multiple specific subscriber type dedicated core networks configured in the core network_A 90. Specifically, a DCN for a UE registered as a user of a Machine to Machine (M2M) communication function may be configured in the core network_A 90, for example. A default DCN for a UE with no proper DCN may be configured in the core network_A 90. Furthermore, in the DCN, at least one or more MMEs_40 or SGSNs_A 42 may be located, and further, at least one or more SGWs_A 35, PGWs_A 30, or PCRFs_A 60 may be located. Note that the DCN may be identified by a DCN ID, and further the UE may be assigned to one DCN, based on the information such as the UE usage type and/or the DCN ID.

Re-attempt information in the present embodiment is information indicated by the network (NW) to the UE_A 10 whether or not to allow reconnection by using the same identification information for a PDU session that has been rejected. Note that the re-attempt information may be configured for each UTRAN access, E-UTRAN access, NR access, or slice information. Furthermore, the re-attempt information specified in access units may be allowed to reconnect to the network, assuming access changes. The re-attempt information specified in slice units may be specified with different slice information than a rejected slice, and may be allowed to reconnect by using the specified slice information.

First behavior in the present embodiment is behavior in which the UE stores slice information transmitted in a first PDU session establishment request message in association with transmitted PDU session identification information. In the first behavior, the UE may store the slice information transmitted in the first PDU session establishment request message or may store the slice information received in a case that the first PDU session establishment request is rejected.

Second behavior in the present embodiment is behavior in which the UE transmits a PDU session establishment request to connect to the same APN/DNN as the first PDU session establishment request, by using another slice information different from the slice information specified in the first PDU session establishment. Specifically, the second behavior may be behavior in which the UE transmits a PDU session establishment request to connect to the same APN/DNN as the first PDU session establishment request, by using another slice information different from the slice information specified in the first PDU session establishment, in a case that a backoff timer value received from the network is zero or deactivated. The second behavior may be behavior in which the UE transmits a PDU session establishment request to connect to the same APN/DNN as the APN/DNN included in the first PDU session establishment request, by using another slice information different from the slice information specified in the first PDU session establishment, in a case that the first PDU session is rejected since the radio access of a specific PLMN to which the specified APN/DNN is connected is not supported, or in a case that the first PDU session is rejected for a temporary reason.

Third behavior in the present embodiment is behavior in which, in a case that the PDU session establishment request is rejected, the UE does not transmit a new PDU session establishment request using the same identification information until the first timer expires. Specifically, the third behavior may be behavior in which the UE does not transmit a new PDU session establishment request using the same identification information until the first timer expires, in a case that the backoff timer value received from the network is not zero nor deactivated. The third behavior may be behavior in which the UE does not transmit a new PDU session establishment request using the same identification information until the first timer expires, in a case that another PLMN is selected, or in a case that another NW slice is selected, and a rejection reason for a configuration failure for network operation is received, or in a case that the backoff timer received at the time that the first PDU session establishment request is rejected has been started.

Fourth behavior in the present embodiment is behavior in which the UE does not transmit a new PDU session establishment request that does not carry the slice information and the DNN/APN information, until the first timer expires, in a case that the PDU session establishment request transmitted in the Registration procedure is rejected. Specifically, the fourth behavior may be behavior in which the UE does not transmit a new PDU session establishment request that does not carry the slice information and the DNN/APN information until the first timer expires, in a case that the backoff timer received from the network is not zero nor deactivated.

Fifth behavior in the present embodiment is behavior in which the UE does not transmit a new PDU session establishment request using the same identification information in a case that the PDU session establishment request is rejected. Specifically, the fifth behavior may be behavior in which the UE does not transmit a new PDU session establishment request using the same identification information in a case that the PDP types supported by the UE and the network are different from each other, and the UE is located in a serving area of the equivalent PLMN.

Sixth behavior in the present embodiment is behavior in which the UE transmits a new PDU session establishment request as an initial procedure by using the same identification information in a case that the PDU session establishment request is rejected. Specifically, the sixth behavior may be behavior in which the UE transmits a new PDU session establishment request as an initial procedure by using the same identification information, in a case that the first PDU session establishment request is rejected since a PDN session context of the target is not present in a handover from a non-3GPP access.

Seventh behavior in the present embodiment is behavior in which the UE continues the backoff timer received at the time that the previous PDU session establishment request is rejected, in a case that another NW slice is selected in the procedure for selecting a PLMN. Specifically, e seventh behavior may be behavior in which the UE continues the backoff timer received at the time that the first PDU session establishment request is rejected, in a case that a PLMN selection is performed at the time that the first PDU session establishment request is rejected, and it is possible to specify a NW slice common to the NW slice specified in the first PDU session establishment request for the PLMN of selection destination.

Eighth behavior in the present embodiment is behavior in which the UE configures a value notified from the network or a value previously configured to the UE as the first timer value. Specifically, the eighth behavior may be behavior in which the UE configures the backoff timer value received in the reject notification for the first PDU session establishment request as the first timer value, or may be behavior in which the UE configures the value configured or held in advance to the UE as the first timer value. Note that, the case that the timer configured or held in advance to the UE is configured as the first timer value may be limited to in a state where the UE is located in a serving area of the HPLMN or the equivalent PLMN.

Ninth behavior in the present embodiment is behavior in which the UE does not transmit a new PDU session establishment request until the terminal power on/off or USIM withdrawal and insertion in a case that the PDU session establishment request is rejected. Specifically, the ninth behavior may be such that the UE does not transmit a new PDU session establishment request until the terminal power on/off or the USIM withdrawal and insertion, in a case that the backoff timer received from the network is deactivated, or in a case that the first PDU session rejection reason is for different PDP types between the UE and the network. The ninth behavior may be behavior in which the UE does not transmit a new PDU session establishment request until the terminal power on/off or the USIM withdrawal and insertion, in the connected PLMN, in a case that the first PDU session is rejected since the specified APN/DNN is not supported in wireless of the connected PLMN, and there is no information element of the backoff timer from the network, and there is no Re-attempt information, or in a case that a PDU session reconnection to the equivalent PLMN is allowed. The ninth behavior may be behavior in which the UE does not transmit a new PDU session establishment request until the terminal power on/off or the USIM withdrawal and insertion, in the connected PLMN, in a case that the first PDU session is rejected since the specified APN/DNN is not supported in wireless of the connected PLMN, and there is no information element of the backoff timer from the network, and there is no Re-attempt information, or in a case that a PDU session reconnection to the equivalent PLMN is not allowed. The ninth behavior may be behavior in which the UE does not transmit a new PDU session establishment request until the terminal power on/off or the USIM withdrawal and insertion, in a case that the first PDU session is rejected since the specified APN/DNN is not supported in wireless of the connected PLMN, and the backoff timer from the network is not zero nor deactivated. The ninth behavior may be behavior in which the UE does not transmit a new PDU session establishment request until the terminal power on/off or the USIM withdrawal and insertion, in a case that the first PDU session is rejected since the specified APN/DNN is not supported in wireless of the connected PLMN, and the backoff timer from the network is deactivated.

10th behavior in the present embodiment is behavior in which the UE transmits a new PDU session establishment request in a case that the PDU session establishment request is rejected. Specifically, the 10th behavior may be behavior in which the UE transmits a new PDU session establishment request, in a case that the backoff timer received from the network is zero, or in a case that the first PDU session establishment request is rejected for temporary reasons and there is no backoff timer information element itself notified from the network. The 10th behavior may be behavior in which the UE transmits a new PDU session establishment request, in a case that another PLMN is selected, or in a case that another NW slice is selected, and the first PDU session establishment request is rejected for temporary reasons, and the backoff timer is not started for the APN/DNN of the target in the selected PLMN. or in a case that the backoff timer received from the network is deactivated. The 10th behavior may be behavior in which the UE transmits a new PDU session establishment request, in a case that the first PDU session establishment request is rejected due to different PDP types of the UE and the network, and Re-attempt information is not received or a PLMN that is not present in an equivalent PLMN list is selected in a case that different PLMN are selected, or in a case that the PDP type is changed, or in a case of the terminal power on/off or the USIM withdrawal and insertion. The 10th behavior may be behavior in which the UE transmits a new PDU session establishment request, in a case that the first PDU session is rejected since the specified APN/DNN is not supported in wireless of the connected PLMN, and the backoff timer notified from the network is zero.

11th behavior in the present embodiment is behavior in which the UE ignores the first timer and the Re-attempt information. Specifically, the 11th behavior may be behavior in which the UE ignores the first timer and the Re-attempt information, in a case that the first PDU session establishment request is rejected since a PDN session context of the target is not present in a handover from a non-3GPP access. or in a case that the first PDU session establishment is rejected since the number of bearers established in the PDN connection reaches a maximum number.

12th behavior in the present embodiment is behavior in which the UE determines information for identifying multiple associated NW slices, based on information for identifying one NW slice received in the reject notification for the first PDU session establishment request, and suppresses reconnection to the multiple associated NW slices, based on the information for identifying one NW slice. Specifically, the 12th behavior may be behavior in which the UE derives information for identifying a NW slice, the information being associated with the information for identifying a NW slice that is different from the NW slice and notified in the first PDU session establishment request reject, based on a network slice associated rule. Note that the network slice associated rule may be configured in advance to the UE or may be notified from the network in a reject notification of the PDU session establishment.

13th behavior in the present embodiment may be such that the UE manages a timer, based on a priority management rule of the backoff timer, in a case that multiple different congestion controls are activated for multiple PDU session establishments by the same UE and multiple timers are received from the network. For example, the first PDU session establishment request of a combination of DNN_1 and slice_1 by the UE is configured to be a target of congestion control based on both DNN and slice information, and the UE receives first timer #1 (also referred to as first timer value #1). Furthermore, the UE issues a second PDU session establishment request for a combination of DNN_1 and slice_2, which is a target of congestion control based only on the DNN, and receives first timer #2 (also referred to as first timer value #2). At this time, for the UE, behavior of the PDU session reestablishment of the UE may be managed by dominant first timer #2, based on the priority management rule of the backoff timer. Specifically, a timer value generated by the prioritized congestion control may override a value of the timer held by the UE.

14th behavior in the present embodiment may manage a timer for each session management instance (PDU session unit) in a case that multiple different congestion controls are activated for multiple PDU session establishments by the same UE and multiple timers are provided from the network. For example, the first PDU session establishment of a combination of DNN #1 and slice #1 by the UE is configured to be a target of congestion control, based on both DNN and slice information, and the UE receives a first timer #1. After that, in a case that the UE attempts to establish a PDU session for the combination of DNN #1 and slice #2 as a second PDU session, the PDU session establishment is configured to be a target of congestion control based only on the DNN and the UE receives first timer #2. At this time, the UE manages multiple timers (here, first timer #1 and first timer #2) at the same time. Specifically, the UE manages the timers in a session management instance/PDU session unit.

The network slice associated rule in the present embodiment is a rule for associating pieces of information identifying multiple network slices with each other. Note that the network slice associated rule may be received in the PDU session reject message or may be configured in advance to the UE_A 10. Furthermore, a newest network slice associated rule may be applied to the UE_A 10. Conversely, the UE_A 10 may perform behavior, based on a newest network slice associated rule. For example, in a case that the UE_A 10 receives a new network slice associated rule in the PDU session reject message while a network slice associated rule is configured to the UE_A 10 in advance, the UE_A 10 may update the network slice associated rule held in the UE_A 10.

The priority management rule of the backoff timer in the present embodiment is a rule configured to the UE_A 10 to collectively manage multiple backoff timers that have occurred in multiple PDU sessions in a single backoff timer. For example, in a case that conflicting or overlapping congestion control is applied and the UE holds multiple backoff timers, the UE_A 10 may collectively manage multiple backoff timers, based on the priority management rule of the backoff timer. Note that a case in which conflicting or overlapping congestion control occurs corresponds to a case that congestion control based only on the DNN and congestion control based on both DNN and slice information are applied at the same time, and in this case, congestion control based only on the DNN is prioritized. Note that the priority management rule of the backoff timer may not be limited to this. Note that the backoff timer may be a first timer included in the PDU session reject message.

Here, the first timer may be a backoff timer for preventing reconnections, configured for multiple associated NW slices based on information for identifying one NW slice as previously described, and configured in a unit of a combination of a backoff timer to suppress reconnection, or APN/DNN and one NW slice, but is not limited to this, and may be a backoff timer for suppressing reconnection, configured in a unit of a combination of multiple associated NW slices based on information for identifying APN/DNN and one NW slice.

Next, the identification information in the present embodiment will be described.

First identification information in the present embodiment is information for identifying belonging to the first NW slice. In other words, the first identification information may be information indicating that the UE desires a PDU session establishment belonging to the first NW slice. Specifically, for example, the first identification information may be information for identifying the first NW slice. Note that the slice information may be identification information indicating a specific S-NSSAI. Note that the first identification information may be information identifying a specific NW slice in the operator A network, or may be information identifying the same NW slice in common in the operator B (other operator(s) other than the operator A). Furthermore, the first identification information may be information for identifying the first NW slice configured from the HPLMN, may be information for identifying the first NW slice obtained from the AMF in the registration procedure, or may be information for identifying the first NW slice that is allowed from the network. Furthermore, the first identification information may be information for identifying the first NW slice stored for each PLMN.

Second identification information in the present embodiment may be Data Network Name (DNN) and may be information used for identifying the Data Network (DN).

Third identification information in the present embodiment may be a PDU Session ID and may be information used for identifying a PDU session.

11th identification information in the present embodiment is information indicating a cause value indicating that the PDU session establishment procedure has been rejected. The 11th identification information may be information indicating that a request for a PDU session establishment to connect to the DN has been rejected. In other words, the 11th identification information may be information indicating that the request for the establishment of a PDU session belonging to the first NW slice has been rejected, or may be information indicating that the establishment of a PDU session belonging to the first NW slice is not allowed. Here, the first NW slice may be a NW slice determined by the first identification information, or may be a different NW slice. Furthermore, the 11th identification information may be information indicating that an establishment of a PDU session belonging to the first NW slice in a DN identified by the 12th identification information is not allowed, or may be information indicating that an establishment of a PDU session belonging to the first NW slice in a PDU session identified by the 13th identification information is not allowed. Furthermore, the 11th identification information may be information indicating that an establishment of a PDU session belonging to the first slice in a registration area and/or a tracking area to which the UE_A 10 currently belongs is not allowed, or may be information indicating that an establishment of a PDU session belonging to the first NW slice in an access network to which the UE_A 10 is connected is not allowed. Note that the cause value indicating that the PDU session establishment procedure indicated by the 11th identification information is rejected may not be limited to these. Furthermore, the 11th identification information may be information indicating a value of the first timer. The UE may configure a value indicated by the 11th identification information to the first timer, may configure a timer value configured in another method, or may configure a random value, based on the reception of the 11th identification information. Furthermore, the 11th identification information may be identification information for identifying one or more NW slices that determine the NW slice to which the rejected PDU session request belongs. Furthermore, the 11th identification information may be identification information in which the network indicates a reconnection after the PDU session has been rejected. Note that the re-attempt information may be configured in each UTRAN access, E-UTRAN access, NR access, and slice information units. Furthermore, the 11th identification information may be identification information indicating auxiliary information for the radio access system to select an appropriate MME in a case that the UE switches the connection destination to the EPS. Note that the auxiliary information may be information indicating the DCN ID. Furthermore, the 11th identification information may be a network slice associated rule that is a rule for associating multiple pieces of slice information. In addition, the UE may initiate running of the configured timer, based on the rejection cause value, the NW slice information, and the identification information indicating reconnection from the network. Furthermore, in a case that the UE switches the connection destination to the EPS, the UE may initiate location registration at the EPS, based on the received rejection cause value, auxiliary information for appropriate MME selection by the radio access system included in the identification information indicating reconnection from the network.

12th identification information in the present embodiment may be a DNN, which may be a DNN that is not allowed by the network, or may be information indicating that the DNN identified by the second identification information is not allowed. Furthermore, the 12th identification information may be the same DNN as the second identification information.

13th identification information the present embodiment may be a PDU Session ID, which may be a PDU session ID not allowed by the network, or may be information indicating that the PDU session ID identified by the third identification information is not allowed. Furthermore, the 13th identification information may be the same PDU session ID as the third identification information.

Figure 8:
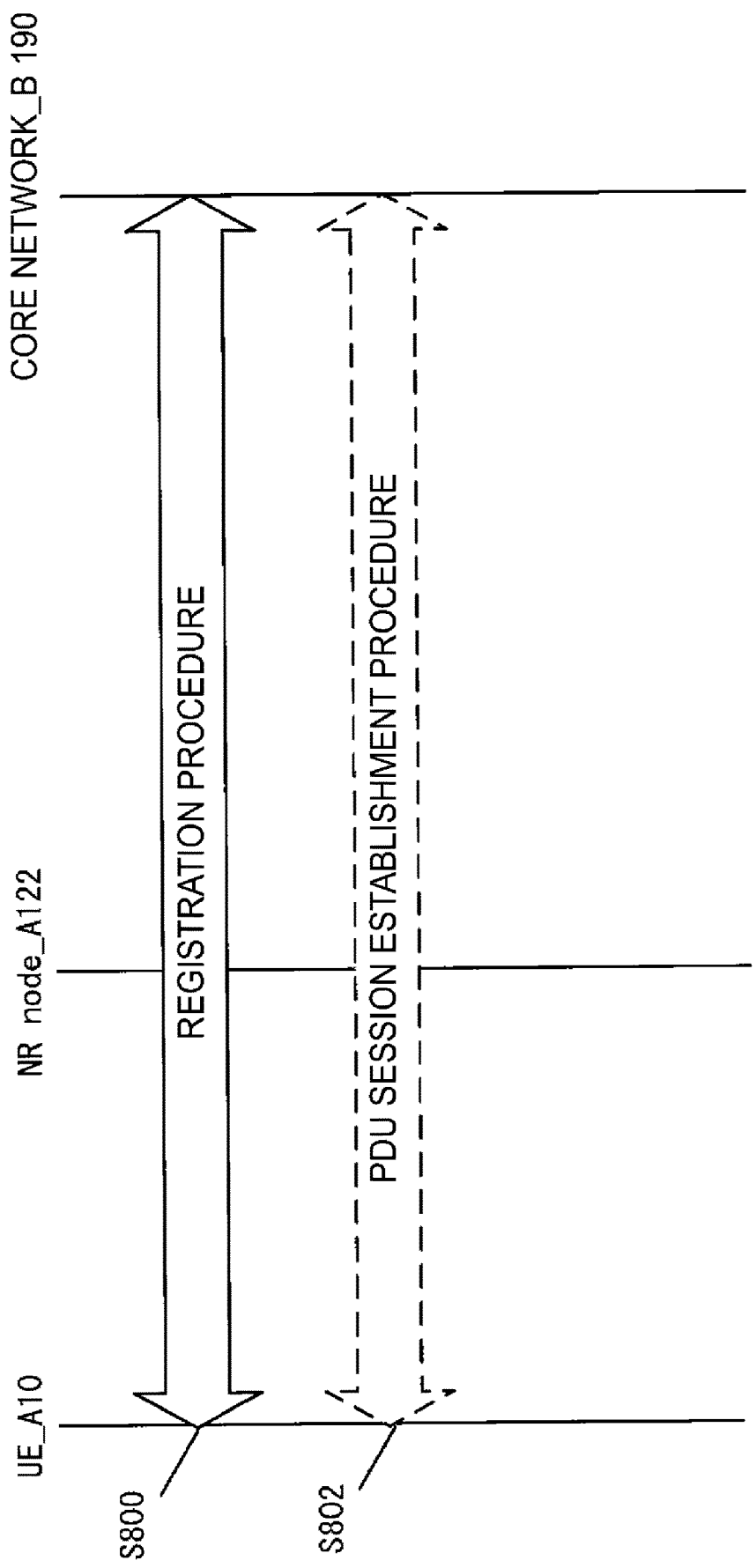
FIG. 8 is a diagram illustrating an initial procedure.

Next, the initial procedure according to the present embodiment will be described with reference to FIG. 8. Hereinafter, the initial procedure is also referred to as the present procedure, and the initial procedure (the present procedure) includes the Registration procedure and the PDU session establishment procedure. Details of the registration procedure and the PDU session establishment procedure will be described later.

Specifically, by performing the registration procedure by each apparatus (S800), the UE_A 10 transitions to a state registered with the network (RM-REGISTERED state). Next, by performing the PDU session establishment procedure by each apparatus (S802), the UE_A 10 establishes the PDU session with the DN_A 5 that provides the PDU connection service via the core network_B 190 and transitions to a state in which the PDU session is established with each of the apparatuses. Note that, although this PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235.

Note that each apparatus may exchange various pieces of capability information and/or various pieces of request information of each apparatus in the registration procedure and/or the PDU session establishment procedure. Note that in a case that each apparatus performs the exchange of various pieces of information and/or negotiation of various requests in the registration procedure, each apparatus need not perform the exchange of various pieces of information and/or the negotiation of various requests in the PDU session establishment procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure. Even in a case that each apparatus performs the exchange of various pieces of information and/or the negotiation of various requests in the registration procedure, each apparatus may perform the exchange of various pieces of information and/or the negotiation of various requests in the PDU session establishment procedure.

Each apparatus may perform the PDU session establishment procedure in the registration procedure or after the registration procedure is completed. In a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In a case that the PDU session establishment procedure is performed in the registration procedure, each apparatus may establish a PDU session, based on the completion of the registration procedure, or may transition to the state in which a PDU session is established between each of the apparatuses.

Each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure

First, the following describes the overview of the registration procedure. The registration procedure is a procedure initiated by the UE_A 10 to perform registration in a network (the access network and/or the core network_B 190 and/or the DN_A 5). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). Each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating specific parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or disabling (referred to as deactivation) of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

1.3.1.1. Example of Registration Procedure

Figure 9:
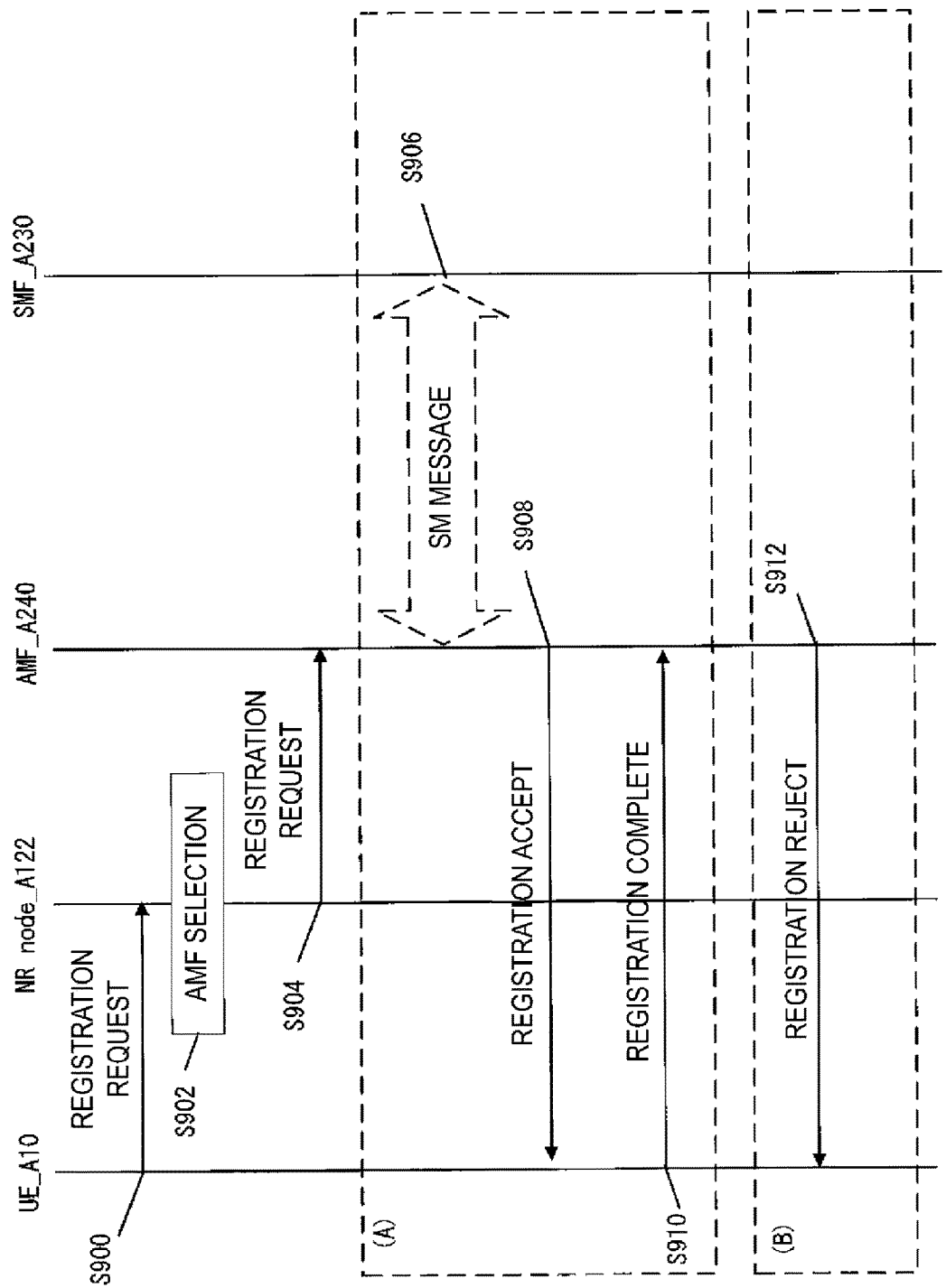
FIG. 9 is a diagram illustrating a registration procedure.

The following describes an example of a procedure to perform the registration procedure with reference to FIG. 9. In this section, the present procedure refers to the registration procedure. Each step of the present procedure will be described below.

First, the UE_A 10 transmits a Registration Request message to the AMF_A 240 via a NR node (also referred to as a gNB)_A 122 (S900), (S902), and (S904) to initiate the registration procedure. The UE_A 10 may transmit a Session Management (SM) message (e.g., a PDU session establishment request message) included in the registration request message, or may transmit the SM message (e.g., the PDU session establishment request message) along with the registration request message to initiate a procedure for SM, such as a PDU session establishment procedure, during the registration procedure.

Specifically, the UE_A 10 transmits a Radio Resource Control (RRC) message including the registration request message to the NR node_A 122 (S900). In a case that the NR node_A 122 receives the RRC message including the registration request message, the NR node_A 122 retrieves the registration request message from the RRC message, and selects the AMF_A 240 as an NF or a common CP function of a routing destination for the registration request message (S902). Here, the NR node_A 122 may select the AMF_A 240 based on information included in the RRC message. The NR node_A 122 transmits or forwards the registration request message to the selected AMF_A 240 (S904).

Note that, the registration request message is a Non-Access-Stratum (NAS) message transmitted and/or received on the N1 interface. The RRC message is a control message transmitted and/or received between the UE_A 10 and the NR node_A 122. The NAS message is processed in an NAS layer, the RRC message is processed in an RRC layer, and the NAS layer is a higher layer than the RRC layer.

In a case that there are multiple NSIs requesting registration, the UE_A 10 may transmit a registration request message for each of the NSIs, or may transmit multiple registration request messages included in one or more RRC messages. The above-described multiple registration request messages included in one or more RRC messages may be transmitted as one registration request message.

In a case that the AMF_A 240 receives the registration request message and/or the control message different from the registration request message, the AMF_A 240 performs first condition determination. The first condition determination is intended to determine whether or not the AMF_A 240 accepts a request of the UE_A 10. In the first condition determination, the AMF_A 240 determines whether the first condition determination is true or false. The AMF_A 240 initiates the procedure of (A) in the present procedure in a case that the first condition determination is true (that is, in a case that the network accepts the request of the UE_A 10), or initiates the procedure of (B) in the present procedure in a case that the first condition determination is false (that is, in a case that the network does not accept the request of the UE_A 10).

As follows, steps in a case that the first condition determination is true, in other words, each step of the procedure of (A) in the present procedure will be described. The AMF_A 240 performs a fourth condition determination, and initiates the procedure of (A) in the present procedure. The fourth condition determination is to determine whether the AMF_A 240 transmits and/or receives the SM message to/from the SMF_A 230. In other words, the fourth condition determination may be intended to determine whether or not the AMF_A 240 performs a PDU session establishment procedure in the present procedure. In a case that the fourth condition determination is true (that is, in a case that the AMF_A 240 performs transmission and/or reception of the SM message with the SMF_A 230), the AMF_A 240 selects the SMF_A 230 and transmits and/or receives the SM message to and/or from the selected SMF_A 230. In a case that the fourth condition determination is false (that is, in a case that the AMF_A 240 does not transmit and/or receive the SM message with the SMF_A 230), the AMF_A 240 skips such processes (S906). Note that in a case that the AMF_A 240 receives an SM message indicating rejection from the SMF_A 230, the AMF_A 240 may terminate the procedure of (A) in the present procedure, and may initiate the procedure of (B) in the present procedure.

Furthermore, the AMF_A 240 transmits the Registration Accept message to the UE_A 10 via the NR node_A 122, based on the reception of the registration request message from the UE_A 10 and/or the completion of the transmission and/or reception of the SM message to/from the SMF_A 230 (S908). For example, in a case that the fourth condition determination is true, the AMF_A 240 may transmit the registration accept message, based on the reception of the registration request message from the UE_A 10. In a case that the fourth condition determination is false, the AMF_A 240 may transmit the registration accept message, based on the completion of the transmission and/or reception of the SM message to and/or from the SMF_A 230. Here, the registration accept message may be transmitted as a response message to the registration request message. The registration accept message is an NAS message transmitted and/or received on the N1 interface, which, for example, the AMF_A 240 may transmit as a control message of the N2 interface to the NR node_A 122, and the NR node_A 122 receiving the registration accept message may include the registration accept message in the RRC message to transmit to the UE_A 10.

Furthermore, in a case that the fourth condition determination is true, the AMF_A 240 may transmit the SM message (e.g., a PDU session establishment accept message) included in the registration accept message, or transmit the SM message (e.g., a PDU session establishment accept message) along with the registration accept message. This transmission method may be performed in a case that the SM message (e.g., the PDU session establishment request message) is included in the registration request message and the fourth condition determination is true. The transmission method may be performed in a case that the registration request message and the SM message (e.g., the PDU session establishment request message) are included and the fourth condition determination is true. The AMF_A 240 may indicate that the procedure for SM has been accepted by performing such a transmission method.

The UE_A 10 receives the registration accept message via the NR node_A 122 (S908). The UE_A 10 receives the registration accept message and recognizes the contents of various types of identification information included in the registration accept message.

Next, the UE_A 10 transmits a Registration Complete message to the AMF_A 240 (S910), based on the reception of the registration accept message. Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be transmitted as a response message to the registration accept message. The registration complete message is an NAS message transmitted and/or received on the N1 interface, which, for example, the UE_A 10 may transmit by including the registration complete message in the RRC message to the NR node_A 122, and the NR node_A 122 receiving the registration complete message may transmit the registration complete message e as a control message of the N2 interface to the AMF_A 240.

The AMF_A 240 receives the registration complete message (S910). Each apparatus completes the procedure of (A) in the present procedure, based on the transmission and/or reception of the registration accept message and/or the registration complete message.

Next, steps in a case that the first condition determination is false, in other words, each step of the procedure of (B) in the present procedure will be described. The AMF_A 240 transmits the Registration Reject message to the UE_A 10 via the NR node_A 122 (S912) to initiate the procedure of (B) in the present procedure. Here, the registration reject message may be transmitted as a response message to the registration request message. The registration reject message is an NAS message transmitted and/or received on the N1 interface, which, for example, the AMF_A 240 may transmit as a control message of the N2 interface to the NR node_A 122, and the NR node_A 122 receiving this may transmit by including it in the RRC message to the UE_A 10. The registration reject message transmitted by the AMF_A 240 is not limited thereto as long as it is a message for rejecting the request of the UE_A 10.

Note that the procedure of (B) in the present procedure may be initiated in a case that the procedure of (A) in the present procedure is canceled. In the procedure (A), in a case that the fourth condition determination is true, the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the UE_A 10 may recognize that a request of the UE_A 10 has been rejected by receiving the registration reject message or not receiving the registration accept message. Each apparatus completes the procedure of (B) in the present procedure based on the transmission and/or reception of the registration reject message.

Each apparatus completes the present procedure (registration procedure), based on the completion of the procedure of (A) or (B) in the present procedure. Note that each apparatus may transition to a state in which the UE_A 10 is registered with the network (RM_REGISTERED state) based on the completion of the procedure of (A) in the present procedure, or may maintain a state in which the UE_A 10 is not registered with the network (RM_DEREGISTERED state) based on the completion of the procedure of (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure.

The first condition determination may be performed based on identification information, and/or subscriber information, and/or an operator policy included in the registration request message. For example, the first condition determination may be true in a case that the network allows a request of the UE_A 10. The first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Furthermore, the first condition determination may be true in a case that it is determined that the network is in a congested state, and may be false in a case that it is determined that the network is not in a congested state. Note that conditions for determining whether the first condition determination is true or false may not be limited to the above-described conditions.

The fourth condition determination may be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. Each apparatus may initiate the present procedure in a registered state, or may initiate the present procedure at any timing after the registration procedure. Each apparatus may establish the PDU session, based on completion of the PDU session establishment procedure. Furthermore, each apparatus may perform the present procedure multiple times to establish multiple PDU sessions.

1.3.2.1. Example of PDU Session Establishment Procedure

Figure 10:
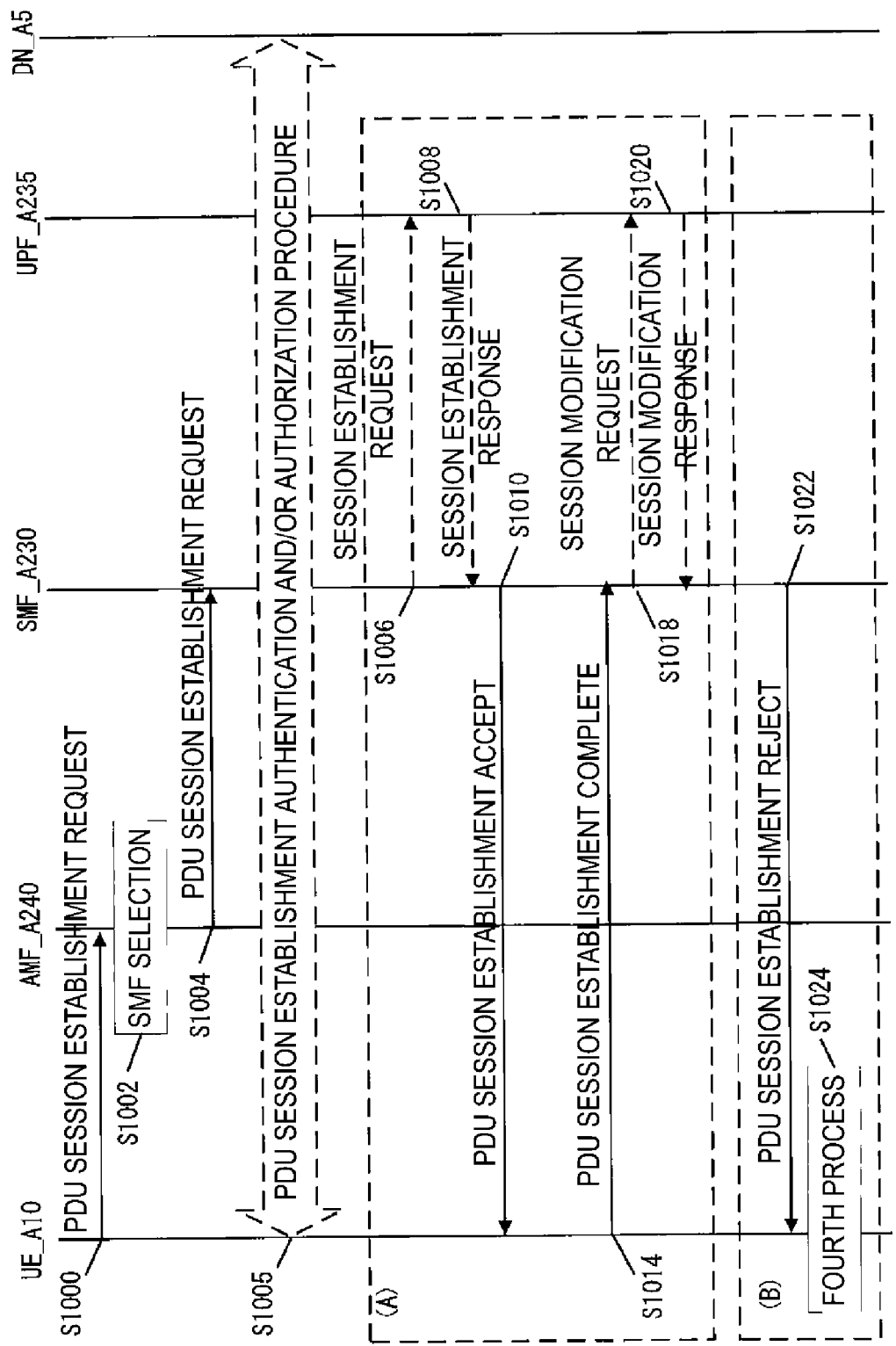
FIG. 10 is a diagram illustrating a PDU session establishment procedure.

With reference to FIG. 10, an example of a process of performing a PDU session establishment procedure will be described. Each step of the present procedure will be described below. First, the UE_A 10 transmits the PDU Session Establishment Request message to the SMF_A 230 via the NR node_A 122 and the AMF_A 240 (S1000), (S1002), and (S1004) to initiate the PDU session establishment procedure.

Specifically, the UE_A 10 transmits the PDU session establishment request message to the AMF_A 240 via the NR node_A 122 using the N1 interface (S1000). In a case that the AMF_A 240 receives the PDU session establishment request message, the AMF_A 240 selects the SMF_A 230 as an NF of a routing destination of the PDU session establishment request message (S1002) and transmits or forwards the PDU session establishment request message to the selected SMF_A 230 using the N11 interface (S1004). Here, the AMF_A 240 may select the SMF_A 230 of the routing destination based on the information included in the PDU session establishment request message. More specifically, the AMF_A 240 may select the SMF_A 230 of the routing destination based on each piece of identification information acquired based on the reception of the PDU session establishment request message, and/or the subscriber information, and/or the capability information of the network, and/or the operator policy, and/or the state of the network, and/or the context already held by the AMF_A 240.

The PDU session establishment request message may be a NAS message. The PDU session establishment request message only needs to be a message requesting the PDU session establishment and not limited to this.

Here, the UE_A 10 may include one or more pieces of identification information among the first identification information to the third identification information in the PDU session establishment request message, and/or may indicate the request of the UE_A 10 by including these pieces of identification information. Note that two or more pieces of these pieces of identification information may be configured as one or more pieces of identification information.

Furthermore, the UE_A 10 may request an establishment of a PDU session belonging to the network slice, may indicate a network slice to which the PDU session belongs requested by the UE_A 10, or may indicate a network slice to which a PDU session is going to belong, by transmitting the first identification information and/or the second identification information and/or the third identification information included in the PDU session establishment request message.

More specifically, the UE_A 10 may request an establishment of a PDU session belonging to the network slice, may indicate a network slice to which the PDU session belongs requested by the UE_A 10, or may indicate a network slice to which a PDU session is going to belong, in a PDU session established for a DN identified by the second identification information by transmitting the first identification information and the second identification information in association with each other.

Furthermore, the UE_A 10 may combine and transmit two or more pieces of identification information of the first to third identification information, thereby making a request combining the above-described matters. Note that matters indicated by the UE_A 10 transmitting each identification information may not be limited thereto.

Note that the UE_A 10 may determine which piece of identification information of the first identification information to the third identification information is to be included in the PDU session establishment request message, based on the capability information of the UE_A 10, and/or the policy such as the UE policy, and/or the preference of the UE_A 10, and/or the application (higher layer). Note that the determination performed by the UE_A 10 as to which piece of identification information is to be included in the PDU session establishment request message is not limited to the determination described above.

The SMF_A 230 receives the PDU session establishment request message, and performs the third condition determination. The third condition determination is to determine whether or not the SMF_A 230 accepts the request of the UE_A 10. In the third condition determination, the SMF_A 230 determines whether the third condition determination is true or false. In a case that the third condition determination is true, the SMF_A 230 initiates the procedure of (A) in the present procedure, and in a case that the third condition determination is false, the SMF_A 230 initiates the procedure of (B) in the present procedure. Note that steps in the case that the third condition determination is false will be described later.

As follows, steps in a case that the third condition determination is true, in other words, each step of the procedure of (A) in the present procedure will be described. The SMF_A 230 selects the UPF_A 235 of the establishment destination of the PDU session, and performs the 11th condition determination.

Here, the 11th condition determination is intended to determine whether or not each apparatus performs a PDU session establishment authentication and/or authorization procedure. In the 11th condition determination, the SMF_A 230 determines whether the 11th condition determination is true or false. The SMF_A 230 initiates the PDU session establishment authentication procedure in a case that the 11th condition determination is true (S1005), and omits the PDU session establishment authentication and/or authorization procedure in a case that the 11th condition determination is false. Note that details of the PDU session establishment authentication and/or authorization procedure will be described later.

Next, the SMF_A 230 transmits the Session Establishment request message to the selected UPF_A 235 (S1006), based on the 11th condition determination and/or the completion of the PDU session establishment authentication and/or authorization procedure, and initiates the procedure of (A) in the present procedure. Note that the SMF_A 230 may initiate the procedure of (B) in the present procedure without initiating the procedure of (A) in the present procedure, based on the completion of the PDU session establishment authentication and/or authorization procedure.

Here, the SMF_A 230 may select one or more UPFs_A 235 based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. In addition, the UPF_A 235 transmits the Session Establishment response message to the SMF_A 230 based on the reception of the session establishment request message and/or the creation of the context for the PDU session (S1008). Furthermore, the SMF_A 230 receives a session establishment response message. Note that the session establishment request message and the session establishment response message may be control messages transmitted and/or received on the N4 interface. Furthermore, the session establishment response message may be a response message to the session establishment request message.

Furthermore, the SMF_A 230 may assign an address to be assigned to the UE_A 10 based on the reception of the PDU session establishment request message and/or the selection of the UPF_A 235 and/or the reception of the session establishment response message. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. Furthermore, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address assignment performed by SMF_A 230 is not limited to these.

Furthermore, the SMF_A 230 may transmit the assigned address included in the PDU session establishment accept message to the UE_A 10, based on the completion of the address assignment of the address assigned to the UE_A 10, or may transmit the assigned address to the UE_A 10 after the completion of the PDU session establishment procedure.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1010).

Specifically, the SMF_A 230 transmits the PDU session establishment accept message to the AMF_A 240 by using the N11 interface. The AMF_A 240 that has received the PDU session establishment accept message transmits the PDU session establishment accept message to the UE_A 10 by using the N1 interface.

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

The UE_A 10 receives the PDU session establishment accept message from the SMF_A 230. The UE_A 10 receives the PDU session establishment accept message and recognizes the contents of various types of identification information included in the PDU session establishment accept message.

Next, the UE_A 10 transmits the PDU session establishment complete message to the SMF_A 230 via the AMF_A 240 (S1014), based on the completion of the reception of the PDU session establishment accept message. Furthermore, the SMF_A 230 receives the PDU session establishment complete message, and performs the second condition determination.

Specifically, the UE_A 10 transmits the PDU session establishment complete message to the AMF_A 240 by using the N1 interface. The AMF_A 240 that has received the PDU session establishment complete message transmits the PDU session establishment complete message to the SMF_A 230 by using the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition determination is for the SMF_A 230 to determine a type of the message on the N4 interface to be transmitted and/or received. In a case that the second condition determination is true, the SMF_A 230 transmits a Session Modification request message to the UPF_A 235 (S1018). In addition, the SMF_A 230 receives a Session Modification response message transmitted from the UPF_A 235 that has received the Session Modification request message (S1020). In a case that the second condition determination is false, the SMF_A 230 transmits a session establishment request message to the UPF_A 235 (S1018), and further receives the session modification accept message transmitted from the UPF_A 235 that has received the session establishment request message (S1020).

Each apparatus completes the procedure of (A) in the present procedure, based on the transmission and/or reception of the PDU session establishment complete message, and/or the transmission and/or reception of a session modification response message, and/or the transmission and/or reception of the session establishment response message, and/or the transmission and/or reception of the RA.

Next, steps in a case that the third condition determination is false, in other words, each step of the procedure of (B) in the present procedure will be described. The SMF_A 230 transmits the PDU session establishment reject message to the UE_A 10 via the AMF_A 240 (S1022), and initiates the procedure of (B) in the present procedure.

Specifically, the SMF_A 230 transmits the PDU session establishment reject message to the AMF_A 240 by using the N11 interface, and the AMF_A 240 that has received the PDU session establishment request message transmits the PDU session establishment reject message to the UE_A 10 by using the N1 interface.

Note that in a case that the PDU session is PDN connection, the PDU session establishment reject message may be a PDN Connectivity reject message. Furthermore, the PDU session establishment reject message may be a NAS message transmitted and/or received on the N11 interface and the N1 interface. The PDU session establishment reject message is not limited to the PDU session establishment reject message described above, and only needs to be a message indicating that the PDU session establishment has been rejected.

Here, the SMF_A 230 may include one or more pieces of identification information among the 11th identification information to the 13th identification information in the PDU session establishment reject message, or may indicate that the request of the UE_A 10 has been rejected by including these pieces of identification information. Note that two or more pieces of these pieces of identification information may be configured as one or more pieces of identification information.

Furthermore, the SMF_A 230 may indicate that a request to establish a PDU session belonging to a network slice has been rejected, or may indicate a network slice that is not allowed to belong to a PDU session, by transmitting the 11th identification information and/or the 12th identification information and/or the 13th identification information included in the PDU session establishment reject message.

More specifically, the SMF_A 230 may indicate that a request to establish a PDU session belonging to a network slice has been rejected, or may indicate a network slice that is not allowed to belong to a PDU session, in a PDU session established for a DN identified with the 12th identification information, by transmitting the 11th identification information and the 12th identification information in association with each other.

Furthermore, the SMF_A 230 may indicate that a request to establish a PDU session belonging to a network slice has been rejected, or may indicate a network slice that is not allowed to belong to a PDU session, in the registration area and/or the tracking area to which the UE_A 10 currently belongs, by transmitting the 11th identification information included in the PDU session establishment reject message.

Furthermore, the SMF_A 230 may indicate that a request to establish a PDU session belonging to a network slice has been rejected, or may indicate a network slice that is not allowed to belong to a PDU session, in the access network to which the UE_A 10 is currently connected, by transmitting the 11th identification information included in the PDU session establishment reject message.

Furthermore, the SMF_A 230 may indicate the value of the first timer, or may indicate whether or not the same procedure as the present procedure to be performed again after the completion of the present procedure, by transmitting the 11th identification information included in the PDU session establishment reject message.

Furthermore, the SMF_A 230 may combine and transmit two or more pieces of identification information from the 11th to 13th identification information to make a request combining the above-described matters. Note that matters indicated by the SMF_A 230 transmitting each identification information may not be limited thereto.

Note that the SMF_A 230 may determine which piece of identification information among the 11th identification information to the 13th identification information is to be included in the PDU session establishment reject message, based on the received identification information, and/or the capability information of the network, and/or the policy such as the operator policy, and/or the state of the network.

Furthermore, the 12th identification information may be information indicating the same DNN as the DNN indicated by the second identification information. Furthermore, the 13th identification information may be information indicating the same PDU session ID as the PDU session ID indicated by the third identification information. Furthermore, the 11th identification information may be information transmitted in a case that the first identification information is received and/or in a case that the network slice indicated by the first identification information is not allowed by the network. Note that determination performed by the SMF_A 230 as to which piece of identification information is to be included in the PDU session establishment reject message is not limited to the determination described above.

The UE_A 10 receives the PDU session establishment reject message from the SMF_A 230. The UE_A 10 performs the fourth process, based on the reception of the PDU session establishment reject message (S1024). The UE_A 10 may perform the fourth process, based on the completion of the present procedure.

Here, the fourth process may be a process in which the UE_A 10 recognizes the matter indicated by the SMF_A 230. Furthermore, the fourth process may be a process in which the UE_A 10 stores the received identification information as a context, or may be a process in which the UE_A 10 transfers the received identification information to the higher layer and/or the lower layer. Furthermore, the fourth process may be a process in which the UE_A 10 recognizes that the request for the present procedure has been rejected.

Furthermore, in a case that the UE_A 10 has received the 11th identification information, the fourth process may be a process in which the UE_A 10 configures the value indicated by the 11th identification information to the first timer value, or may be a process for starting the first timer with the timer value configured. Furthermore, in a case that the UE_A 10 has received the 11th identification information, the fourth process may be a process for performing one or more behaviors of the first to 11th behaviors.

Furthermore, in a case that the UE_A 10 has received the 11th identification information, the fourth process may be a process in which the UE_A 10 performs the 12th behavior, based on information that identifies the NW slice included in the 11th identification information, and the network slice associated rule included in the 11th identification information or the network slice associated rule configured in which the UE_A 10 is held in advance.

Furthermore, in a case that the UE_A 10 has received multiple pieces of the 11th identification information, the fourth process may be a process in which the UE_A 10 performs the 13th behavior, based on multiple first timers included in each piece of the 11th identification information and the priority management rule of a backoff timer held by the UE_A 10.

Furthermore, in a case that the UE_A 10 has received multiple pieces of the 11th identification information, the fourth process may be a process in which the UE_A 10 performs the 14th behavior, based on multiple first timers included in each piece of the 11th identification information.

Here, the 12th to 14th behaviors may be congestion control initiated by the UE_A 10, based on rules and/or policies within the UE_A 10. Specifically, for example, the UE_A 10 may include: policies (UE policies) and/or rules; a management function of the policies and/or the rules; a policy enforcer configured to operate the UE_A 10, based on the policies and/or the rules; one or more applications; and a session management instances (a session manager) configured to manage one or more PDU sessions to establish or attempt to establish, based on a request from each application, in a storage unit and/or a controller within the UE_A 10, and by performing any of the 12th to 14th behaviors as the fourth process, based on these, congestion control initiated by the UE_A 10 may be implemented. Here, the policies and/or rules may include one or more of network slice associated rule, and/or priority management rule for a backoff timer, and/or or a Network Slice Selection Policy (NSSP), which may further be configured in advance to the UE_A 10 or received from the network. Here, the policy enforcer may be an NSSP enforcer. Here, the application may be a protocol of an application layer, and may establish or attempt to establish a PDU session, based on a request from the protocol of the application layer. Here, the session management instance may be a software element dynamically generated in a PDU session unit. Here, the S-NSSAI may be grouped as the internal processing of the UE_A 10, or a processing based on the grouping of the S-NSSAI may be performed. Note that the internal configuration and processing of the UE_A 10 are not limited thereto, and each element may be implemented in software or may be performed as a software processing within the UE_A 10.

Furthermore, the UE_A 10 may switch to the EPS in the fourth process or based on the completion of the fourth process, and may initiate the location registration at the EPS, based on the DCN ID included in the 11th identification information. Note that the switch of the UE_A 10 to the EPS may be based on a handover procedure, or may be an RAT switch initiated by the UE_A 10. In a case that the UE_A 10 receives the 11th identification information including the DCN ID, the UE_A 10 may perform the switch to the EPS during the fourth process or after the completion of the fourth process.

Furthermore, the fourth process may be a process in which the UE_A 10 starts the present procedure again after a certain period of time, or may be a process in which the UE_A 10 transitions to a state in which requests of the UE_A 10 are limited. Note that the fourth process need not be limited to these processes.

Furthermore, the UE_A 10 may recognize that a request of the UE_A 10 has been rejected by receiving the PDU session establishment reject message or not receiving the PDU session establishment accept message. Each apparatus completes the procedure of (B) in the present procedure, based on transmission and/or reception of the PDU session establishment reject message.

Each apparatus completes the present procedure, based on completion of the procedure of (A) or (B) in the present procedure. Note that each apparatus may transition to a state in which the PDU session is established, based on the completion of the procedure of (A) in the present procedure. Each apparatus may recognize that the present procedure has been rejected, or may transition to a state in which the PDU session is not established, based on the completion of the procedure of (B) in the present procedure.

Furthermore, each apparatus may perform processing based on identification information transmitted and/or received in the present procedure, based on completion of the present procedure. In other words, the UE_A 10 may perform the fourth process, based on the completion of the present procedure.

The third condition determination may be performed based on the identification information included in the PDU session establishment request message, and/or the subscriber information, and/or the operator policy. For example, the third condition determination may be true in a case that the network allows a request of the UE_A 10. The third condition determination may be false in a case that the network does not allow a request of the UE_A 10. Furthermore, in a case that the network as the connection destination of the UE_A 10 and/or the apparatus in the network supports the function requested by the UE_A 10, the third condition determination may be true, and in a case that the function is not supported, the third condition determination may be false. Furthermore, the third condition determination may be true in a case that it is determined that the network is in a congested state, and may be fake in a case that it is determined that the network is not in a congested state. Note that conditions for determining whether the third condition determination is true or false may not be limited to the above-described conditions.

The second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Conditions for determining true or false of the second condition determination need not be limited to the above-described conditions.

The 11th condition determination may be performed based on the identification information included in the PDU session establishment request message, and/or the subscriber information, and/or the operator policy. For example, the 11th condition determination may be true in a case that the network allows authentication and/or authorization by the DN_A 5 to be performed in the present procedure. The 11th condition determination may be false in a case that the network does not allow authentication and/or authorization by the DN_A 5 to be performed in the present procedure. Furthermore, the 11th condition determination may be true in a case that the network as the connection destination of the UE_A 10 and/or the apparatus in the network supports authentication and/or authorization by the DN_A 5 to be performed in the present procedure, or may be false in a case of not supporting. Furthermore, the 11th condition determination may be true in a case that 61th identification information is received, or may be false in a case of not receiving. In other words, the 11th condition determination may be true in a case that a container including information such as SM PDU DN Request Container and/or multiple pieces of information is received, or may be false in a case of not receiving. Note that conditions for determining whether the 11th condition determination is true or false may not be limited to the above-described conditions.

Thus, in a user equipment according to the present embodiment, the first identification information is information indicating a value of the backoff timer that manages session management behavior of the user equipment, the second identification information is information for identifying one or more network slices belonging to a Protocol Data Unit or a Packet Data. Unit (PDU) session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a Dedicated Core Network (DCN), the sixth identification information is information indicating a reason why a request for an establishment of a PDU session has been rejected, and the user equipment includes: a transmission and/or reception unit configured to receive a PDU session establishment reject message including at least one piece of the first to sixth identification information, in a PDU session establishment procedure for a core network; and a controller configured to configure the first identification information to a first timer and determine whether or not to re-establish a PDU session, based on at least one piece of the first to sixth identification information, in a PDU session establishment procedure for the core network.

In a core network apparatus according to the present embodiment, the first identification information is information indicating a value of the backoff timer that manages session management behavior of the user equipment, the second identification information is information for identifying one or more network slices belonging to a PDU session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a DCN, the sixth identification information is information indicating a reason why a request for an establishment of a PDU session has been rejected, and the core network apparatus includes: a transmission and/or reception unit configured to transmit a PDU session establishment reject message including at least one piece of the first to sixth identification information, in a PDU session establishment procedure for a core network.

In a Session Management Function (SMF) according to the present embodiment, the first identification information is information indicating a value of the backoff timer that manages session management behavior of the user equipment, the second identification information is information for identifying one or more network slices belonging to a PDU session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a Dedicated Core Network (DCN), the sixth identification information is information indicating a reason why a request for an establishment of a PDU session has been rejected, and the SMF includes: a transmission and/or reception unit configured to transmit a PDU session establishment reject message including at least one piece of the first to sixth identification information, in a PDU session establishment procedure for a core network.

In a communication control method for a user equipment according to the present embodiment, the first identification information is information indicating a value of the backoff timer that manages session management behavior of the user equipment, the second identification information is information for identifying one or more network slices belonging to a Protocol Data Unit or a Packet Data Unit (PDU) session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a Dedicated Core Network (DCN), the sixth identification information is information indicating a reason why a request for an establishment of a PDU session has been rejected, and the user equipment includes the steps of: configuring the first identification information to a first timer; and receiving a PDU session establishment reject message including at least one piece of the first to sixth identification information, in a PDU session establishment procedure for a core network.

In a communication control method for a core network apparatus according to the present embodiment, the first identification information is information indicating a value of the backoff timer that manages session management behavior of the user equipment, the second identification information is information for identifying one or more network slices belonging to a Protocol Data Unit or a Packet Data Unit (PDU) session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a Dedicated Core Network (DCN), the sixth identification information is information indicating a reason why a request for an establishment of a PDU session has been rejected, and the core network apparatus includes the step of: transmitting a PDU session establishment reject message including at least one piece of the first to sixth identification information, in a PDU session establishment procedure for a core network.

In a communication control method according to the present embodiment, the first identification information is information indicating a value of the backoff timer that manages session management behavior of the user equipment, the second identification information is information for identifying one or more network slices belonging to a Protocol Data Unit or a Packet Data Unit (PDU) session to which a request for an establishment of a PDU session is rejected, the third identification information is information for identifying a network slice that allows reconnection of a PDU session, the fourth identification information is information for indicating a network slice associated rules for associating information for identifying a network slice belonging to a rejected PDU session and information for identifying another network slice, the fifth identification information is information for identifying a Dedicated Core Network (DCN), the sixth identification information is information indicating a reason why a request for an establishment of a PDU session has been rejected, and the SMF includes the step of: transmitting a PDU session establishment reject message including at least one piece of the first to sixth identification information, in a PDU session establishment procedure for a core network.

2. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
10 UE_A
20 UTRAN_A
22 NB_A
24 RNC_A
30 PGW_A
35 SGW_A
40 MME_A
45 eNB_A
50 HSS_A 80 E-UTRAN_A
90 Core network_A
120 NG-RAN_A
122 NR node_A
190 Core network_B
230 SMF_A
235 UPF_A
239 UPF_C
240 AMF_A

The invention claimed is:

1. A User Equipment (UE) comprising:
a controller,
wherein
a first timer is running for Data Network Name (DNN) based congestion control on a per DNN basis,
a second timer is running for Single Network Slice Selection Assistance information (S-NSSAI) based congestion control on a per S-NSSAI and DNN basis,
the first timer and the second timer are associated with the same DNN as a DNN provided by the UE, and
the controller runs the first timer and the second timer simultaneously.

2. A communication control method performed by a User Equipment (UE), the communication control method comprising:
running a first timer for Data Network Name (DNN) based congestion control on a per DNN basis,
running a second timer for Single Network Slice Selection Assistance information (S-NSSAI) based congestion control on a per S-NSSAI and DNN basis,
wherein
the first timer and the second timer are associated with the same DNN as a DNN provided by the UE, and
the UE runs the first timer and the second timer simultaneously.

3. A User Equipment (UE) comprising:
a controller,
wherein
a first timer is running for Data Network Name (DNN) based congestion control on a per DNN basis,
a second timer is running for Single Network Slice Selection Assistance information (S-NSSAI) based congestion control on a per S-NSSAI and DNN basis,
the first timer and the second timer are associated with the same DNN as a DNN provided by the UE, and
the controller is configured to:
start the second timer while the first timer is running, or start the first timer while the second timer is running.

4. A communication control method performed by a User Equipment (UE), the communication control method comprising:
running a first timer for Data Network Name (DNN) based congestion control on a per DNN basis,
running a second timer for Single Network Slice Selection Assistance information (S-NSSAI) based congestion control on a per S-NSSAI and DNN basis,
wherein
the first timer and the second timer are associated with the same DNN as a DNN provided by the UE, and
the UE is configured to:
start the second timer while the first timer is running, or start the first timer while the second timer is running.

* * * * *